(12) United States Patent
Yatabe et al.

(10) Patent No.: US 10,116,936 B2
(45) Date of Patent: Oct. 30, 2018

(54) MOVING IMAGE CODING DEVICE, MOVING IMAGE DECODING DEVICE, MOVING IMAGE CODING METHOD, AND MOVING IMAGE DECODING METHOD

(71) Applicant: Hitachi Information & Telecommunication Engineering, Ltd., Yokohams-shi, Kanagawa (JP)

(72) Inventors: Yuusuke Yatabe, Tokyo (JP); Hironori Komi, Yokohama (JP); Yoshimasa Kashihara, Yokohama (JP); Kazunori Saito, Yokohama (JP)

(73) Assignee: Hitachi Information & Telecommunication Engineering, Ltd., Kanagawa (JP)

( * ) Notice: Subject to any disclaimer, the term of this patent is extended or adjusted under 35 U.S.C. 154(b) by 0 days.

(21) Appl. No.: 15/114,862

(22) PCT Filed: Aug. 28, 2015

(86) PCT No.: PCT/JP2015/074454
§ 371 (c)(1),
(2) Date: Jul. 28, 2016

(87) PCT Pub. No.: WO2016/047375
PCT Pub. Date: Mar. 31, 2016

(65) Prior Publication Data
US 2017/0180730 A1    Jun. 22, 2017

(30) Foreign Application Priority Data
Sep. 24, 2014  (JP) .................................. 2014-193391

(51) Int. Cl.
*H04N 19/00* (2014.01)
*H04N 19/119* (2014.01)
(Continued)

(52) U.S. Cl.
CPC ........... *H04N 19/119* (2014.11); *H04N 19/13* (2014.11); *H04N 19/137* (2014.11); *H04N 19/14* (2014.11);
(Continued)

(58) Field of Classification Search
CPC .... H04N 19/61; H04N 19/189; H04N 19/176; H04N 19/146; H04N 19/14; H04N 19/137; H04N 19/13; H04N 19/119
See application file for complete search history.

(56) References Cited

U.S. PATENT DOCUMENTS 7,859,574 B1 *  12/2010  Alvarez ............... H04N 19/176
                                                         348/220.1
9,497,460 B2 *  11/2016  Tanaka ................ H03M 7/4006
(Continued)

FOREIGN PATENT DOCUMENTS

EP      2 290 985 A1     3/2011
JP      2008-042571 A    2/2008
(Continued)

OTHER PUBLICATIONS

Extended European Search Report received in corresponding European Application No. 15844504.9 dated Apr. 20, 2018.
(Continued)

*Primary Examiner* — Mia M Thomas
(74) *Attorney, Agent, or Firm* — Mattingly & Malur, PC

(57) ABSTRACT

The present invention makes moving-image coding and decoding with low power consumption possible even when a Context-based Adaptive Binary Arithmetic Coding (CABAC) process is used. A preprocess for coding an image is executed for each macro block (MB), the MB information that is the result of the process is written into a storage unit in the order in which the MBs were processed, and the MB information stored in the storage unit is read out in order of
(Continued)

raster and the MBs are coded. When the coded image is decoded, the MBs constituting the coded image are decoded in order of raster, the MB information that is the result of the decoded process is stored in the storage unit, and a decoded information readout process that is a post-process for decoding the image is executed in the order in which the MBs were processed.

20 Claims, 14 Drawing Sheets

(51) Int. Cl.
    *H04N 19/13*     (2014.01)
    *H04N 19/137*     (2014.01)
    *H04N 19/146*     (2014.01)
    *H04N 19/14*     (2014.01)
    *H04N 19/176*     (2014.01)
    *H04N 19/189*     (2014.01)
    *H04N 19/61*     (2014.01)

(52) U.S. Cl.
    CPC ......... *H04N 19/146* (2014.11); *H04N 19/176* (2014.11); *H04N 19/189* (2014.11); *H04N 19/61* (2014.11)

(56) References Cited

U.S. PATENT DOCUMENTS

| | | | | |
|---|---|---|---|---|
| 9,877,033 | B2* | 1/2018 | Andrijanic | H04N 19/433 |
| 2003/0111534 | A1* | 6/2003 | Hillmann | G06K 9/00067 |
| | | | | 235/454 |
| 2006/0187794 | A1* | 8/2006 | Harvey | G11C 13/042 |
| | | | | 369/103 |
| 2007/0025444 | A1* | 2/2007 | Okada | H04N 19/52 |
| | | | | 375/240.16 |
| 2009/0091806 | A1* | 4/2009 | Inuiya | H01L 27/14634 |
| | | | | 358/482 |
| 2009/0245664 | A1* | 10/2009 | Matsumoto | H04N 19/176 |
| | | | | 382/234 |
| 2010/0061464 | A1* | 3/2010 | Watanabe | H04N 19/61 |
| | | | | 375/240.24 |
| 2010/0215104 | A1* | 8/2010 | Osamoto | H04N 5/23254 |
| | | | | 375/240.16 |
| 2011/0200115 | A1* | 8/2011 | Hayashi | H04N 19/176 |
| | | | | 375/240.24 |
| 2011/0317769 | A1* | 12/2011 | Tanaka | H03M 7/4006 |
| | | | | 375/240.24 |
| 2012/0183079 | A1* | 7/2012 | Yoshimatsu | H04N 19/44 |
| | | | | 375/240.25 |
| 2012/0263233 | A1* | 10/2012 | Iwata | H04N 19/176 |
| | | | | 375/240.12 |
| 2013/0206959 | A1* | 8/2013 | Zhang | H04N 5/361 |
| | | | | 250/208.1 |
| 2014/0003532 | A1* | 1/2014 | Coban | H04N 19/463 |
| | | | | 375/240.24 |
| 2015/0139334 | A1* | 5/2015 | Eregala | H04N 19/96 |
| | | | | 375/240.24 |
| 2016/0080767 | A1* | 3/2016 | Bae | H04N 19/176 |
| | | | | 375/240.16 |
| 2017/0013268 | A1* | 1/2017 | Kim | H04N 19/61 |
| 2017/0019676 | A1* | 1/2017 | Tanaka | H03M 7/4006 |
| 2018/0020233 | A1* | 1/2018 | Shimazaki | H04N 19/593 |

FOREIGN PATENT DOCUMENTS

| | | |
|---|---|---|
| JP | 2009-239565 A | 10/2009 |
| JP | 2009-296169 A | 12/2009 |
| WO | 2009/150808 A1 | 12/2009 |
| WO | 2012/014471 A1 | 2/2012 |

OTHER PUBLICATIONS

Chong, J. et al., "Efficient Parallelization of H.264 Decoding with Macro Block Level Scheduling", 2007 IEEE International Conference, Jul. 1, 2007, pp. 1874-1877.

Chi, C. et al., "Parallel Scalability and Efficiency of HEVC Parrallelization Approaches", Dec. 1, 2012, pp. 1827-1838, vol. 22, No. 12.

Baaklini, E. et al., "Scalable Row-Based Parallel H.264 Decoder on Embedded Multicore Processors", Signal, Image and Video Processing, Mar. 21, 2014, pp. 57-71, vol. 9, No. 1.

Azevedo, A. et al., "Parallel H.264 Decoding on an Embedded Multicore Processor", ECCV 2016 Conference, Jan. 25, 2009, pp. 404-418.

* cited by examiner

FIG.10

| MODE | IMAGE SIZE | FRAME RATE | REQUIRED PERFORMANCE (COMPARED TO FIRST MODE) | REQUIRED PROCESSING TIME (COMPARED TO FIRST MODE) | M VALUE | REQUIRED SEARCH RANGE (COMPARED TO FIRST MODE) |
|---|---|---|---|---|---|---|
| 1 | FHD | 30p | 1 | 1 | 3 | 1 |
| 2 | FHD | 60p | 2 | 1/2 | 3 | 1/2 |
| 3 | 4k2k | 30p | 4 | 1/4 | 1 | 1/3 |
| 4 | FHD | 120p | 4 | 1/4 | 1 | 1/12 |

MOVING IMAGE CODING DEVICE, MOVING IMAGE DECODING DEVICE, MOVING IMAGE CODING METHOD, AND MOVING IMAGE DECODING METHOD

TECHNICAL FIELD

The present invention relates to a moving image coding/decoding device for coding and decoding a moving image with low power consumption, and a method for the same.

BACKGROUND ART

Patent Literature 1 discloses a technology of performing a coding process by parallelizing a moving image with respect to each MB (Macro Black) line without dividing it into a plurality of slices in order to code the moving image with low power consumption and high image quality. Patent Literature 2 discloses a technology that makes it possible to stream the moving image in the order of the coded MBs specified by the H.264 standard (ITU-T H.264) even if quantization parameters (MB_qp_delta) are parallelized according to the MB line when performing the coding process by parallelizing the moving image with respect to each MB line.

CITATION LIST

Patent Literature 1: Japanese Unexamined Patent Application Publication No. 2008-042571
Patent Literature 1: Japanese Unexamined Patent Application Publication No. 2009-239565

SUMMARY OF INVENTION

Technical Problem

Although there is the CABAC (Context-based Adaptive Binary Arithmetic Coding) coding process in the H.264 standard as a process that requires the streaming in the order of the coded MBs in addition to the quantization parameters, Patent Literatures 1 and 2 do not disclose any means for coding and decoding the moving image with the low power consumption by parallelizing the corresponding processes.

The present invention is made in view of the above, and it is an object of the invention to provide a moving image coding device, a moving image decoding device, and a moving image coding/decoding method that enable coding and decoding of the moving image with the low power consumption even when using the CABAC coding process.

Solution to Problem

To solve the aforementioned problems and achieve the object, the present invention provides a moving image coding device that divides an image into MBs and codes the MBs, including: an MB parallel processing unit that performs preprocessing to code the image with respect to each of the MBs and writes the resulting MB information in a storage unit in the processing order of the MBs; and a coding unit that reads out the MB information stored in the storage unit in a raster order and codes the MBs.

The present invention also provides a moving image decoding device that decodes a coded image with respect to each MB, including: a decoding unit that decodes the MBs contained in an MB line constituting the image in a raster order and stores MB information as a result of the decoding process in a storage unit; and a plurality of decoded information readout units that perform a coded information readout process that is a post process for decoding the image in the processing order of the MBs.

The present invention is also understood as a moving image coding/decoding method performed by the moving image coding device and/or the moving image decoding device described above.

Advantageous Effects of Invention

According to the present invention, it is made possible to code and decode a moving image with the low power consumption even when using the CABAC coding process.

BRIEF DESCRIPTION OF DRAWINGS

FIG. 10 A diagram showing a setting example of the three processing modes assumed with the moving image coding device.

DESCRIPTION OF EMBODIMENTS

Hereinbelow, embodiments of a moving image coding device, a moving image decoding device, and a moving image coding/decoding method according to the present invention are described in detail with reference to appended drawings.

Figure 1:
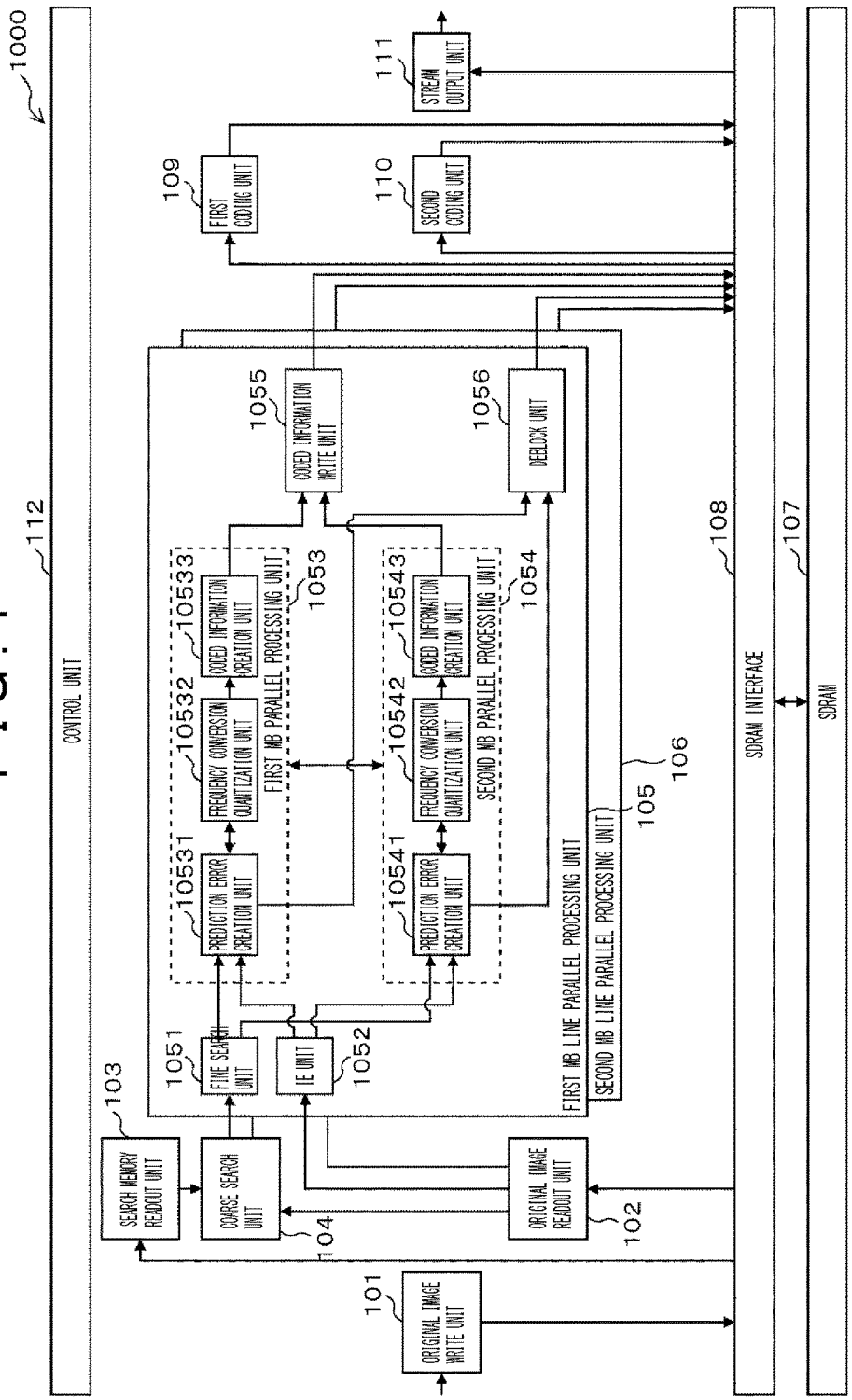
FIG. 1 A configuration diagram of a moving image coding device according to an embodiment of the present invention.

(Configuration of Coding Device)
FIG. 1 is a configuration diagram of a moving image coding device according to an embodiment of the present invention. As shown in FIG. 1, the moving image coding device 1000 includes an original image write unit 101 that stores an original image input with respect to each frame in an SDRAM 107, an original image readout unit 102 that reads out the original image with respect to each MB from the SDRAM 107 and supplies it to a coarse search unit 104, a first MB line parallel processing unit 105, and a second MB line parallel processing unit 106, a search memory readout unit 103 that reads out from the SDRAM 107 and retains a reference image used by a motion detecting unit, a coarse search unit 104 that calculates a motion vector indicative of a moving amount and a moving direction of the MB from the original image and the reference image, a plurality of MB line parallel processing units (the first MB line parallel processing unit 105, the second MB line parallel processing unit 106) that process MB lines in parallel, the SDRAM 107 that is an external memory retaining the reference image and the original image, an SDRAM interface 108 that governs an interface with the SDRAM 107, a plurality of coding units (a first coding unit 109, a second coding unit 110) that read out the parallel processed MB, MB information, coded information, and the like from the SDRAM interface 108 in an MB raster order, generate a stream therefrom, and transfer the stream to the SDRAM interface 108, and a stream output unit 111 that reads out the stream from the SDRAM interface 108 in a coding order.

Furthermore, the first MB line parallel processing unit 105 includes a fine search unit 1051 that receives a coarse search result and the reference image with respect to each MB and performs a fine search to determine a finer vector, an IE unit 1052 that receives the original image from the original image readout unit 102 and determines a prediction mode of an intra prediction, a plurality of MB parallel processing units (a first MB parallel processing unit 1053 and a second MB parallel processing unit 1054) that process the MB lines in parallel, a coded information write unit 1055 that bundles the coded information output from respective MB parallel processing units into the MB line and transfers it to the SDRAM interface 108, and a deblock unit 1056 that applies a deblock filter to decoded images output from the respective MB parallel processing units and transfers them to the SDRAM interface 108. Because the second MB line parallel processing unit 106 has the similar configuration to that of the first MB line parallel processing unit 105, the description thereof is omitted herein.

Moreover, the first MB parallel processing unit 1053 includes a prediction error creation unit 10531 that calculates a prediction residual of either an intra prediction (Intra) or an inter prediction (Inter), obtains decoded residual data output from a frequency conversion quantization unit 10532, and creates the decoded image therefrom, the frequency conversion quantization unit 10532 that creates the coded information for coding by performing a frequency conversion on a prediction error for quantization and creates decoded residual data by inverse quantizing the quantized data for inverse frequency conversion, and a coded information creation unit 10533 that bundles the data output from the frequency conversion quantum unit 10532 and information including block division information to be stored in a coded stream, a prediction mode, and a quantization value. It should be noted that the second MB parallel processing unit 1054 has a similar configuration to that of the first MB parallel processing unit 1053 and therefore the description thereof is omitted herein.

In the example shown in FIG. 1, each MB line parallel processing unit includes two MB parallel processing units that process an even-numbered MB and an odd-numbered MB in parallel with respect to each MB line, and each MB parallel processing unit performs the parallel coding while referring to each other for required MB information. For example, in the first MB line parallel processing unit 105, the first MB parallel processing unit 1053 processes the even-numbered MB of the even-numbered MB line and the second MB parallel processing unit 1054 processes the odd-numbered MB of the even-numbered MB line. In the second MB line parallel processing unit 106, the first MB parallel processing unit 1063 processes the even-numbered MB of the odd-numbered MB line and the second MB parallel processing unit 1064 processes the odd-numbered MB of the odd-numbered MB line.

The first coding unit 109 and the second coding unit 110 are processing units that perform the coding process using the techniques such as, for example, CABAC and CAVLC (Context-based Adaptive VLC) in the H.264, and that perform the parallel processing with respect to each frame. For example, when coding two frames separately, respective coding units perform the process in parallel. It should be noted that the control unit 112 governs the control over a pipeline operation in each unit constituting the moving image coding device as well as calculation and transfer of the coded information.

(Operation of Moving Image Coding Device)

Figure 2:
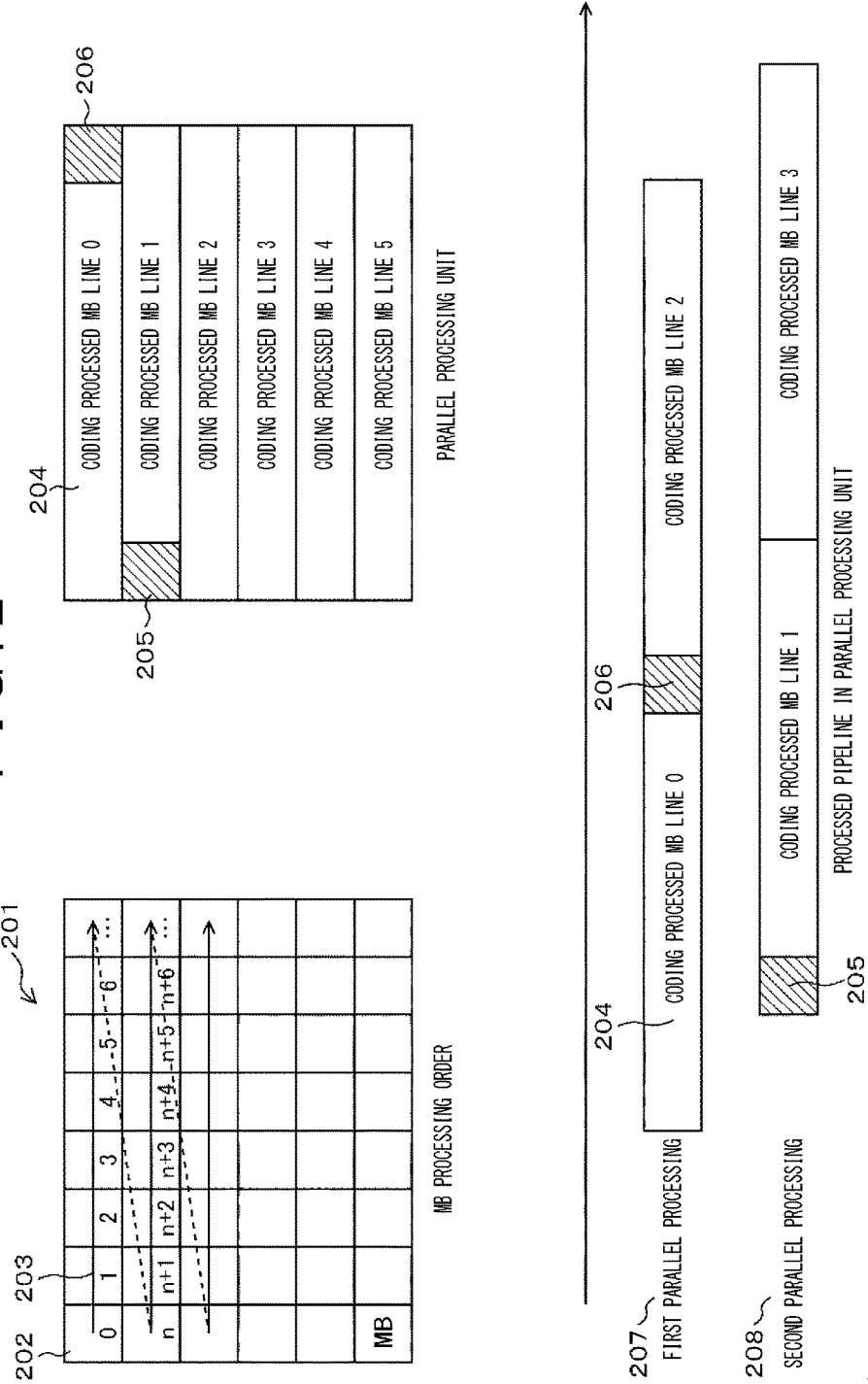
FIG. 2 A diagram showing a frame structure in a moving image as a unit to be coded by the moving image coding device.

Detailed operation of the moving image coding in this moving image coding device is described below. FIG. 2 is a diagram showing the frame structure of a moving image that is the unit to be coded by the moving image coding device. Based on an international standard of the moving image coding such as the H.264, a frame 201 is divided into MBs 202, each of which is a coding unit of a rectangular shape, and they are streamed from the top left toward the right in a raster order 203. In the H.264 standard, there exists a process of streaming each MB with reference to already coded MB information. It should be noted that the MB information used herein refers to information including a quantization coefficient (MB_qp_delta), an update of a probability estimation table of each coefficient in the CABAC coding process (context index), an update of a section width in an arithmetic coding (codIRange, codIOffset, valMPS), and the like.

In Patent Literatures 1 and 2 cited above, the frame 201 is not processed in the raster order but MB lines included in the frame 201 are defined as processed MB lines 204 and they are processed in parallel. In the case of the dual parallel, at a first parallel processing 207 and a second parallel processing 208, the MB lines are parallelized and processed simultaneously.

At this point, the first MB (for example, MB 205) of the MB line executed at the second parallel processing 208 needs to perform streaming 209 with reference to the MB information of the last MB 206 of the previous MB line executed at the first parallel processing 207. However, in parallel processing the pipeline, because the first MB 205 of the next MB line must be processed before processing the last MB 206, it is not possible to refer to the MB information immediately before.

Moreover, although Patent Literature 2 describes a solution to the problem of the quantization coefficient, no solution to the CABAC coding process is provided in it. The moving image coding cannot be processed in parallel unless this problem is solved.

The present invention aims to overcome the above problem by dividing the moving image coding into two processing parts according to the properties of the processes performed by each unit, performing the parallel processes on the former part by the unit of each MB, temporarily storing the result thereof in a memory, reading out the data in the order of the frames and reading out the MBs contained in the frame in the coding order, and coding the MBs accordingly.

(Technique of Parallelizing MB Line Processing in CABAC Coding Process)

Figure 3:
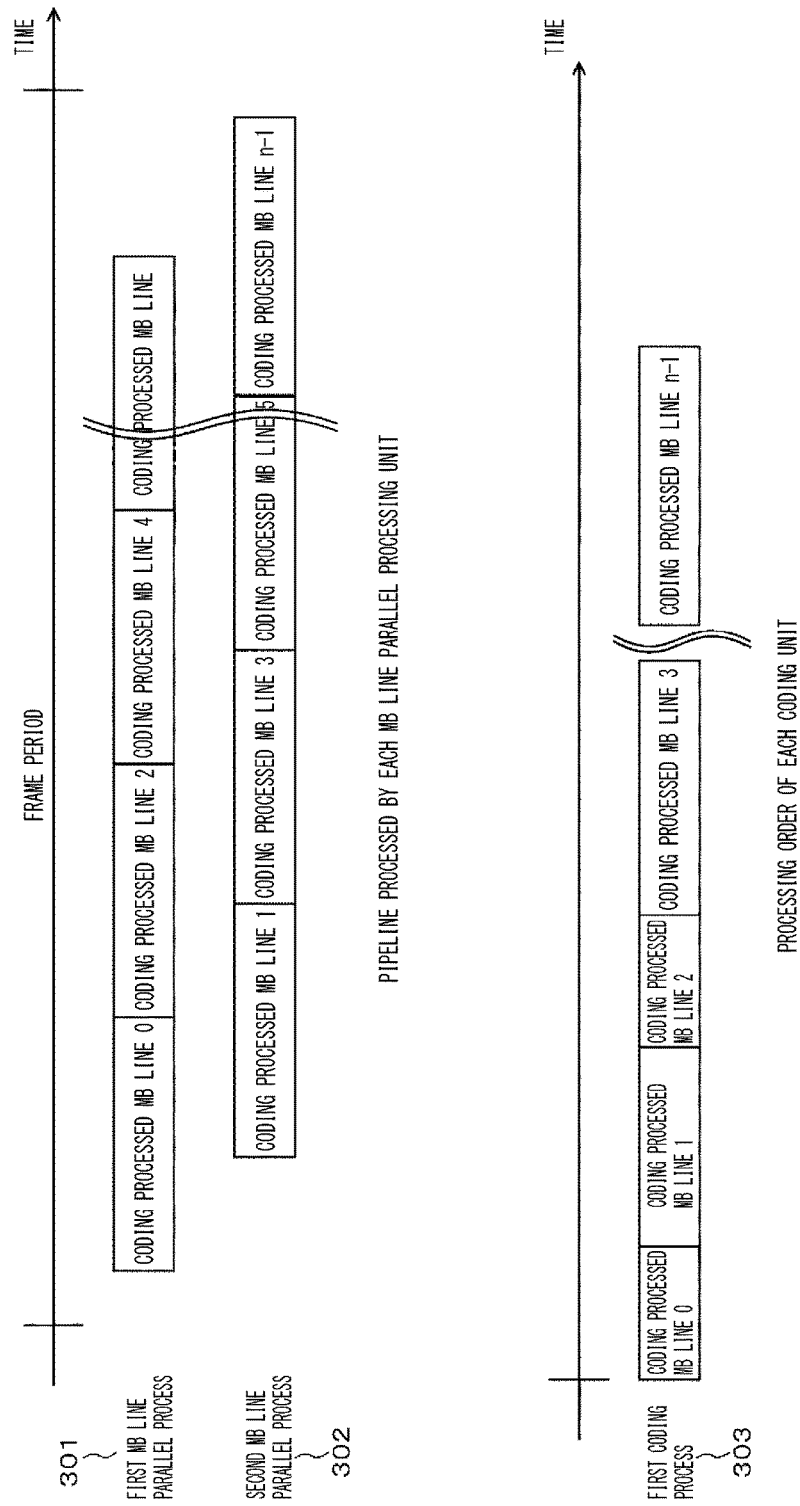
FIG. 3 A diagram schematically showing a pipeline processing in the moving image coding device.

The moving image coding device processes a plurality of MB lines using respective MB line parallel processing units, as shown in FIG. 1. The coded information of each of the even-numbered MB line and the odd-numbered MB line is temporarily stored in the SDRAM 106, and each coding units reads out and codes the coded information of the MB in the order of the MBs contained in the frame to be coded. FIG. 3 shows an outline of the pipeline processing in this moving image coding device. In FIG. 3, the first MB line parallel processing unit 105 performs the first MB line parallel process 301 for processing the even-numbered MB line and the second MB line parallel processing unit 106 performs the second MB line parallel process 302 for processing the odd-numbered MB line, thereby processing the MB lines in parallel. Each MB line parallel processing unit processes the MB line and sequentially stores the coded information contained in the processed MB line in the SDRAM 107. Then, as shown in the lower part of FIG. 3, each coding unit reads out and codes the coded information in the order of the MBs to be coded in the MB line stored in the SDRAM 107. The lower part of FIG. 3 shows an example in which the first coding unit performs a first coding process 303. That is, when the MB lines are processed in parallel, this moving image coding device sequentially writes the processed coded information into the SDRAM 107, then reads out and codes the MBs in the order of frames and of the MBs constituting the frame, when each coding unit performs the coding. This enables the CABAC coding process even when the MB lines and MBs are processed in parallel.

(Image Quality Improvement)

Constituting the moving image coding device as described above enables image quality improvement. The image quality improvement is described hereinbelow.

Figure 4:
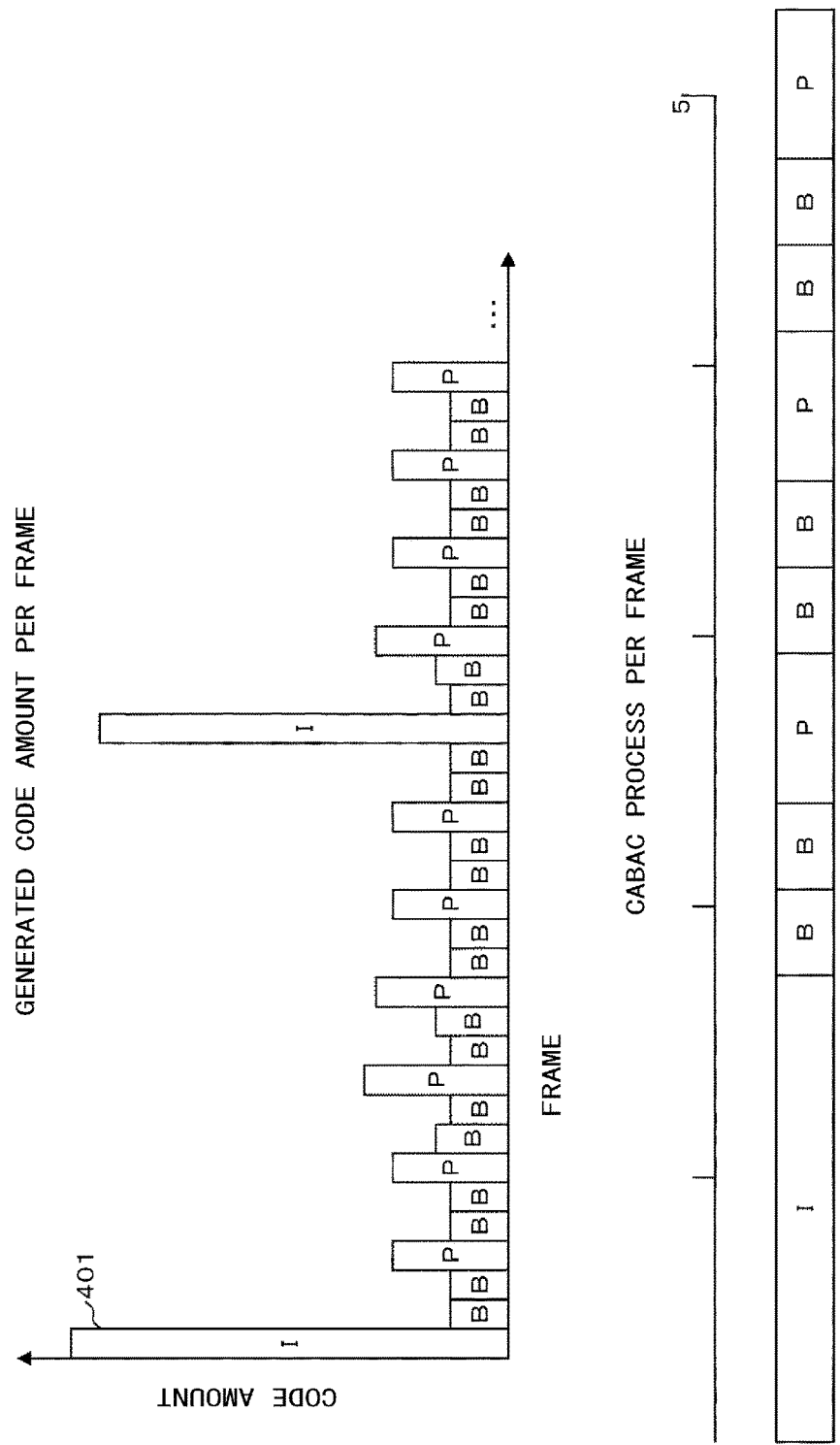
FIG. 4 A diagram showing an example of a generated code amount in a typical moving image coding.

FIG. 4 shows an example of the generated code amount in a typical moving image coding. In order to perform the coding so as to achieve the high image quality, it is effective to alter the code amount according to the type of the picture to be coded, such as allocating more code amounts to an I picture 401 that serves as a base of the reference, as shown in the upper part of FIG. 4.

On the other hand, while the hardware circuit such as the coarse search unit or the MB line parallelization processing unit can be designed with a substantially fixed cycle count according to the number of pixels, the hardware circuit of the coding unit that performs the CABAC process is typically designed with varying processing cycles depending on the generated code amount. Hence, as shown in the lower part of FIG. 4, the hardware circuit of the coding unit has a problem that the processing time may change with respect to each frame if the generated code amount is different from frame to frame. The lower part of FIG. 4 shows a scenario in which the processing time is consumed by the I picture having a large generated code amount. In such a case of operating both the process with the substantially fixed cycle count (first-half process) and the variable process (last-half process) using the same pipeline, unless interim information is temporarily stored in a buffer such as the SDRAM at an intermission of the process, it may be required to stop the first-half process until the last-half process is terminated if the processing cycle of the last-half process is extended, which makes it difficult to perform the coding in real time.

Thus, this moving image coding device makes it possible to process each frame even with a large change of the code amount and to achieve the coding with high image quality by having the coarse search unit and the MB line parallel process perform the parallel process, temporarily storing the result in a high-capacity external buffer such as the SDRAM 107, reading out the result, and having the coding unit process the result.

Figure 5:
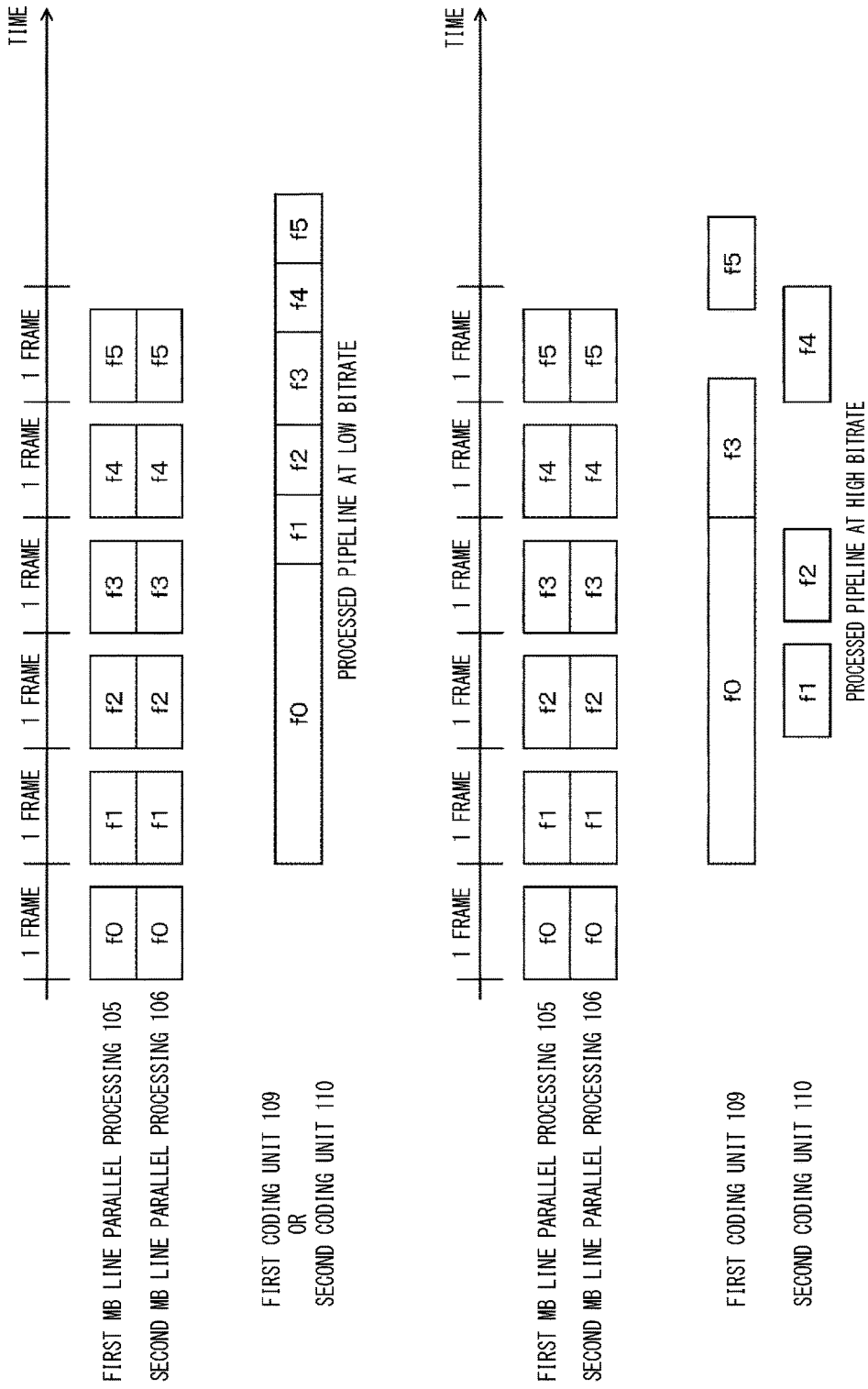
FIG. 5 A diagram showing the pipeline processing by the unit of frame to be processed by the moving image coding device.

FIG. 5 shows the pipeline processing by the unit of frame to be processed by the moving image coding device. The upper part of FIG. 5 shows an example of the case where there is one coding unit, where the first MB line parallel processing unit 105 and the second MB line parallel processing unit 106 perform the parallel process of the MB lines in the order of frames to be coded in one frame period (f0→f1→f2). The first coding unit 109 or the second coding unit 110 performs the process according to the generated code amount in the order of the coded frames (f0→f1→f2). It is found from the upper part of FIG. 5 that a longer processing time is taken in the first frame f0 that is the I picture due to a larger generated code amount, and that the B picture takes shorter processing time due to the smaller generated code amount as compared to the I picture.

The lower part of FIG. 5 shows an example of the case where the coding units perform the coding process in parallel with respect to each frame, where each coding unit sequentially perform the parallel processing by the unit of frame having been processed by the MB line parallel processing unit, stores the stream created with respect to each frame in the SDRAM 107 that is the external memory again, reads out the stream using the stream output unit 111 in the order of coded frames, and outputs the stream to the outside as the final stream. It should be noted that the number of the coding unit to be driven can be determined by the user setting according to the required bitrate. For example, there may be one coding unit when 40 Mbps is required as shown in the upper part of FIG. 5, or there may be two coding units when 80 Mbps is required as shown in the lower part of FIG. 5.

(Information Stored in Intermediate Buffer)

Now, the coded information stored in the SDRAM 107 is described below. The coded information output from each MB line parallel processing unit and stored in the SDRAM 107 may be, for example, pixel data after quantization, quantization information, information indicative of whether non-zero coefficient after quantization, information indicative of whether inter-frame coding or intra-frame coding, and, in a case where the intra-frame coding is selected, such information as vector information, division information, predictive direction information, frequency conversion size information, and the like, or in a case where the inter-frame coding is selected, such information as prediction information, block division information, and the like. They are constantly stored in the memory at a predetermined data amount specified to be stored in the SDRAM 107 and each coding unit reads out the predetermined amount, or the write address of the MB data is managed and read out by the coding unit. The data stored in the SDRAM 107 may be the data formed by binary processing the information described above in the CABAC process.

(First-Half Unit Parallel Processing)

The parallel processing that enables power consumption reduction in a configuration in which each coding unit performing the CABAC coding process described above and each MB line parallel processing unit performing processes before the CABAC coding process via an external memory like the SDRAM 107. Patent Literature 1 discloses the technique of performing the parallel process with respect to each MB line. However, in order to achieve a higher processing performance, it is required to process the MB lines in parallel according to the degree of improvement of the processing performance. At this point, due to the configuration of juxtaposing the coarse search unit 104 that requires a large scale circuit and the search memory readout unit 103 that needs to retain a large number of reference images, the correspondingly large scale of the circuit and accompanying power consumption are required.

To overcome such a problem, this moving image coding device performs the parallel process with respect to each MB belonging to the MB line to be processed (for example, separating even-numbered MBs from odd-numbered MBs) to share the coarse search unit 104 and the search memory readout unit 103 among a plurality of MB line parallel processing units and also to reduce the number of the MB lines to be processed by each MB line parallel processing unit. The processing time is determined depending on the number of the MBs to be processed in parallel, and the coarse search unit 104 outputs the result processed within the processing time sequentially to each MB line parallel processing unit. For example, when the coarse search unit 104 separates the MB lines to be processed into even-numbered MB lines and odd-numbered MB lines and further separates each MB line into even-numbered MBs and odd-numbered MBs for the parallel processing, the coarse search unit 104 specifies the processing time at the MB parallel processing unit in advance, allocates a quarter of the specified time to the processing of each MB, and outputs the processing result to order each MB line parallel processing unit.

(Search Range)

Figure 6:
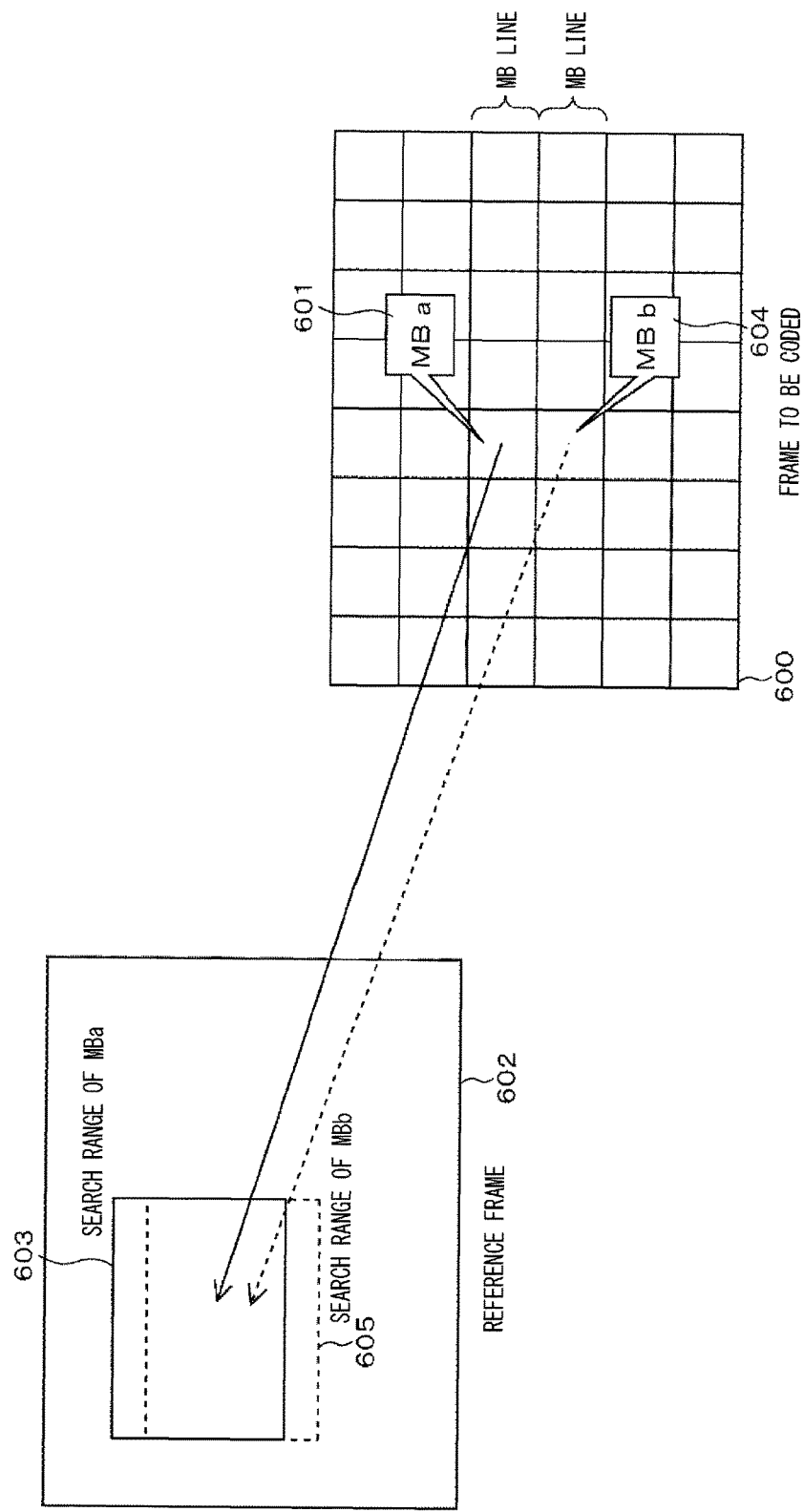
FIG. 6 A diagram showing an example of search ranges in different MB lines.

As shown in FIG. 1, this moving image coding device includes one search memory readout unit 103 and one coarse search unit 104 for a plurality of MB line parallel processing units. Now, the sharing of the search memory readout unit 103 is explained below. FIG. 6 shows an example of search ranges in different MB lines. FIG. 6 shows the search ranges of an MBa 601 belonging to a certain MB line and of an MBb 604 belonging to the next MB line in a frame to be coded 600 as a search range 603 and a search range 605 for motion search of the MBb.

The motion search herein refers to a process of searching for which part of the reference frame a pattern of the MB in the frame to be coded is closest to and determining its position (vector) in order to remove a redundancy between frames in the image coding. The search range refers to a range of the search in the reference frame when performing the motion search. The search range is generally defined to be larger than the MB on the reference frame and a difference in pixel values in the range between the original image and the reference image is calculated, thereby determining its vector. It is found in FIG. 6 that the search ranges of the MBa 601 and the MBb 604 includes the substantially same area.

Hence, the search memory readout unit 103 retains only the pixels included in the search range among the MB lines to be parallelized in the reference frame, and the coarse search unit 104 performs the coarse search, thereby greatly reducing the number of the retained pixels compared to the case of having the search memory readout unit 103 and the coarse search unit 104 separately.

(Coarse Search Unit)

The coarse search unit 104 is configured to have a circuit that reads out the reference image from the search memory readout unit 103 and calculates the difference value between the pixels in the image to be coded and the pixels in the reference image, and a circuit that counts the difference values and determines the minimum difference value. The circuit that calculates the difference in the errors generally includes small-scale arithmetic circuits and performs the required number of searches by clocking a plurality of circuits because a parallel arrangement of arithmetic units sufficient for all the pixels to be searched will increase the scale of the circuit. The number of the arithmetic circuits is determined based on the number of searches and the number of clocks for which search must be terminated. The required number of the clocks will be described later.

(Parallelized Pipeline)

Figure 7:
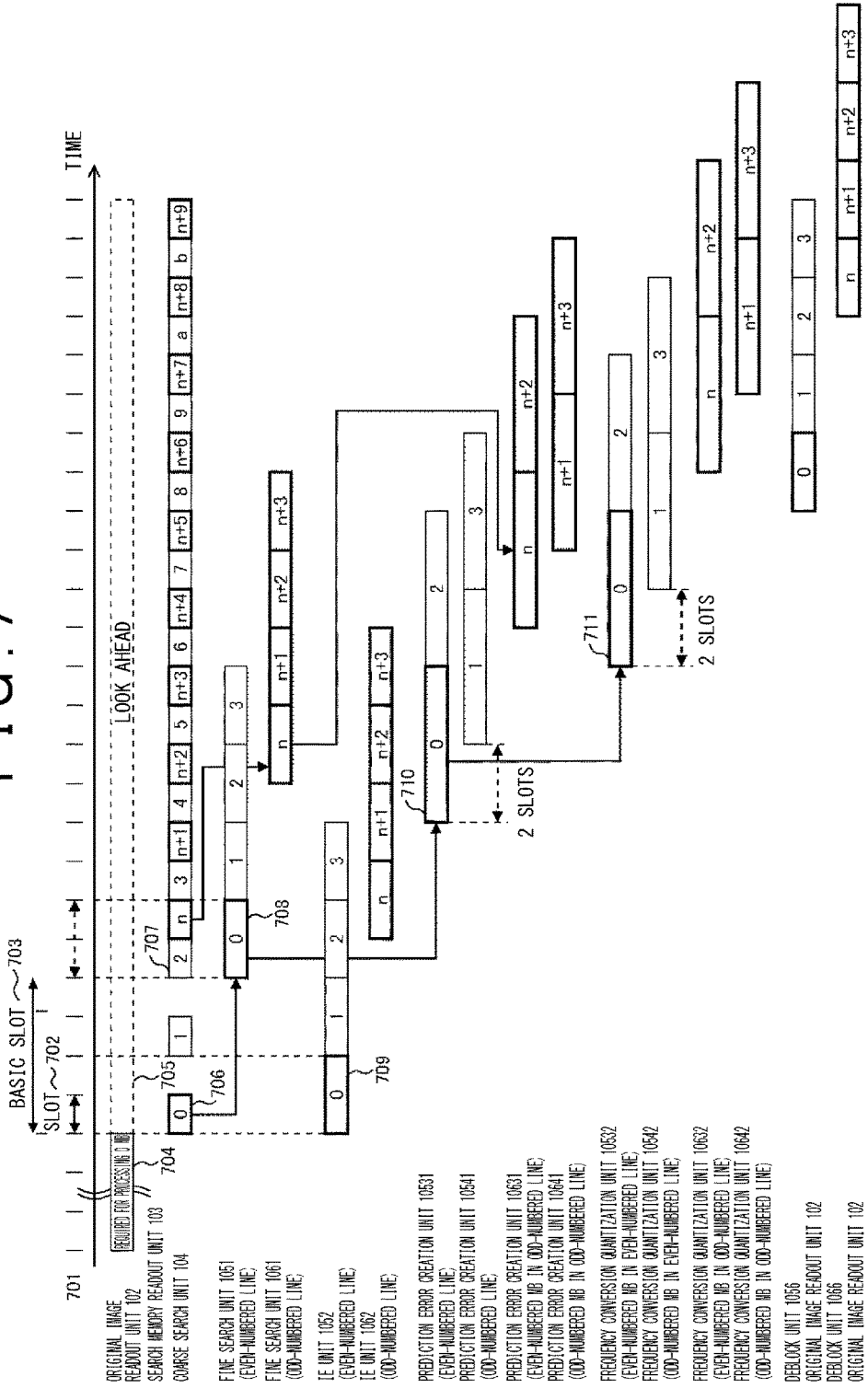
FIG. 7 A diagram showing an example of a pipeline in a case of parallel processing two MB lines using the configuration shown in FIG. 1 (coding).

A process in which the coarse search unit 104 supplies data to MBs in a plurality of MB lines is described below using a pipeline. FIG. 7 shows an example of a pipeline in a case of parallel processing two MB lines using the configuration shown in FIG. 1 for the process in a frame. In this example, the first MB line parallel processing unit 105 shown in FIG. 1 processes the even-numbered MB line, and the second MB line processing unit processes the odd-numbered MB line. Among the MBs contained in the MB line, the even-numbered MB is processed by the first MB parallel processing unit 1053 and the odd numbered MB is processed by the second MB parallel processing unit 1054.

FIG. 7 shows which MB is being processed by each unit shown in FIG. 1 at a certain time point, assuming MB numbers in the first MB line as 0→1→2→3 from left to the right and MB numbers belonging to the MB line one level lower to be processed in parallel as n→n+1→n+2→n+3 from the left to the right (refer to the processing order of the MBs shown in FIG. 2). In the figure, a temporal axis 701 is indicated toward the right, and the time required to process one MB calculated from a frame rate, an image size, and an operation clock number is determined as a slot 702.

Moreover, in this example, because the MB parallel processing unit performs a quad-parallel process (first MB parallel processing unit 1053 and second MB parallel processing unit 1054 in first MB line parallel processing unit 105, first MB parallel processing unit 1063 and second MB parallel processing unit 1064 in second MB line parallel processing unit 106), the processing time for 4 MBs is indicated as a basic slot 703. At this point, durations of the slots to be processed may vary depending on the number of the processing units connected in parallel for the parallel processing. For example, in the quad-parallel processing, a single circuit needs to complete its operation within a duration of four slots (basic slot), a circuit operating in dual-parallel processing needs to complete its operation within a duration of two slots, and a single circuit needs to complete it within one slot.

The original image to be coded and the reference image used for the inter prediction are assumed to have been stored in the SDRAM 107, and the process in a frame is now described in detail.

At the front of the frame processing, the original image readout unit 102 and the search memory readout unit 103 look ahead 704 at least the pixels of the original image in the first MB to be processed and the pixels of the reference image for the search range required for the coarse search, and stores them therein as the data required for the coarse search unit 104 and the IE unit of each MB line parallel processing unit. In this configuration, the MB data to be processed in the pipeline is always sequentially looked ahead 704 to replenish the data. When storing the required data is completed, the coarse search unit 104 starts to process the first MB.

The coarse search unit 104 alternately processes the line containing a 0 MB 706 and the line containing the n MB 707 basically with respect to each slot. For example, the coarse search unit 104 alternately processes the MB in the even-numbered MB line pre-processed by the first MB line parallel processing unit 105 and the MB in the odd-numbered MB line pre-processed by the second MB line parallel processing unit 106 in the coding order.

In the moving image coding, however, the coding is often performed with reference to an MB belonging to an MB line above the MB that is being coded. Therefore, the processing of the corresponding MB starts at least after the MB that is referenced has been processed. In this example, in the line containing the 0 MB 706 and the line containing the n MB 707, the processing of the n MB in the n MB 707 starts after the processing of three MBs in the line containing the 0 MB 706 is completed, as an example.

The fine search unit 1051 receives the vector and the reference image from the coarse search unit 104, receives the original image from the original image readout unit 102, and searches for the vector with a higher precision. In this example, because one fine search unit is provided to each MB line parallel processing unit and each MB line has one circuit, the processing is terminated in the duration of two slots. For example, because one fine search unit 1051 is provided to the first MB line parallel processing unit 105, each MB in the MB line containing the 0 MB 706 is processed during the duration 708 constituted by two slots indicated by a dotted line in the first search unit 1051. In a case of the second MB line parallel processing unit 106, one fine search unit 1061 is provided similarly, and therefore the MBs in the MB line containing the n MB 707 are processed in the duration of two slots.

The IE unit 1052 of the first MB line parallel processing unit 105 receives the original image from the original image readout unit 102 and determines the mode of the intra prediction. As with the fine search unit, the IE unit also includes one circuit with respect to each MB line and performs the process in the two-slot duration 709. The same applies to the case of the IE unit 1062 of the second MB line parallel processing unit 106.

One prediction error creation unit and one frequency conversion quantization unit of the MB parallel processing unit are provided to each of the MB parallel processing units. In the example shown in FIG. 1, the first MB line parallel processing unit 105 includes the first MB parallel processing unit 1053 that processes the even-numbered MB in the even-numbered MB line and the second MB parallel processing unit 1054 that processes the odd-numbered MB in the same MB line. Similarly, the second MB line parallel processing unit 106 also includes the first MB parallel processing unit 1063 that processes the even-numbered MB in the odd-numbered MB line and the second MB parallel processing unit 1064 for the odd-numbered MB in the same MB line. To process them in parallel, at most a half of the duration of the basic slot is offset for the parallel processing. At this point, because the processing of each MB requires referring to information of the peripheral MBs, the information required for processing the next MB is determined within the half slot. The data requiring the periphery is the information defined by various moving image compression standards, such as the coded information and the decoded image before implementing a deblock filter required for the Intra prediction.

In the parallel processing with the half slot offset, because the duration of the basic slot is equal to four slots in this example, the prediction error creation unit and the frequency conversion quantization unit of the MB parallel processing unit perform the process with the time offset by the durations 710 and 711 of at most two slots, respectively.

Each prediction error creation unit generates a prediction image from the vector information received from the fine search unit and the reference image at the time of the Inter prediction. Each frequency conversion quantization unit then takes the difference from the original image, performs the frequency conversion and the quantization on the error image, and transfers the result to each coded information creation unit. Each coded information creation unit bundles the MB information with respect to each MB line and transfers the coded information to the SDRAM 107. Each deblock unit performs the in-loop filter processing on the decoded image output from each prediction image generation unit, and transfers the filtered decoded image to the SDRAM 107. It should be noted that, though not shown in the figure, the generation of the prediction image at the time of the Intra prediction by the prediction error creation unit and the generation of the decoded image are performed at the same time as the processing time of the frequency conversion quantization unit.

Such control enables the parallel processing with respect to each MB without greatly increasing the data amount of reference image read out to be stored in a search memory required for the coarse search and the search circuit, thereby achieving the low power consumption. Although this embodiment is described based on a system of temporarily storing the processing result of each MB line parallel processing unit and the processing result of each coding processing unit in the SDRAM 107, even when another system is employed in which the results are not stored in the SDRAM 107, it is also possible to achieve the similar parallelization by coupling each coding processing unit to each MB line parallel processing unit so that the processing result from each MB line parallel processing unit is input to each coding processing unit.

(Image Quality Degradation Problem in Parallelization)

Next, an image quality improvement in the parallel processing of the MB line performed by the moving image coding device is described below. While the image quality improvement is described in Patent Literature 2, when parallel processing the MB line, a QP of the first MB belonging to the MB line being parallel-processed needs to be fixed to a predetermined value regardless of its image quality. When employing this method, however, more lines are fixed as the parallelism increases, thereby degrading the image quality. Moreover, because the position of the MB to be fixed is specified among the MBs belonging to the MB line, there is a problem that an image quality gap appears at the corresponding position. This is described below in detail.

As shown in FIG. 2, when parallelizing the MB lines, it is necessary to code the MB corresponding to the future in the MB coding order first. In such a case, the following methods are mentioned in Patent Literature 2. One is a method of forcefully validating a CBP (Coded Block Pattern) by fixing the QP of the first MB of the first MB line. The second one is a method of forcefully validating the CBP of the MB1 by fixing the QP of the MB at the end of the MB line (MB1) and of the MB at the top of the MB line (MBn). The reason for forcefully validating the CBP is that there is a rule of not coding the QP when the CBP is invalid in the H.264 standard and therefore the QP cannot be fixed unless the CBP is forcefully validated.

In the second method described above, the QPs of both the MB1 and the MBn are fixed. However, the QP may not necessarily be fixed when the CBP of the MBn is valid, e.g., the QP is fixed only when the CBP of the MBn is invalid. Moreover, the position to which the QP is fixed may not necessarily be the top or the last of the MB line.

Thus, in this embodiment, the position of the forceful validation of the CBP and the position of the QP fixation may be at any MB in the MB line. That is, even when the QP of the MB in the middle of the MB line is fixed, it suffices to set the predetermined QP value to MBs starting from the MB for which the QP is fixed through to the last MB. In this case, the predetermined QP value is used for those from the MB for which the CBP is forcefully validated to the last MB of the line, and the first MB of the next line is coded with the QP only when the CBP is invalid.

It should be noted that, the fixed QP may be the predetermined fixed value or other values calculated using a minimum value, a medium value, an average value, or the like of the peripheral MB. This enables the change of the position at which the QP is fixed as well as the coding with the gap of the image quality minimized.

(Function Improvement)

In general, equipment with the moving image coding device is provided with various processing modes for adjusting the image quality and the recording time in order to be adapted the preference of the user or various applications. Accordingly, it is also intended to design the moving image coding device with the low power consumption assuming that the resolution and the frame rate may be changed. Hereinbelow, an example of three processing modes assumed with the moving image coding device is described. An adjustment mode is setting information for changing the number of lines processed in parallel according to the performance of the output image.

Figure 8:
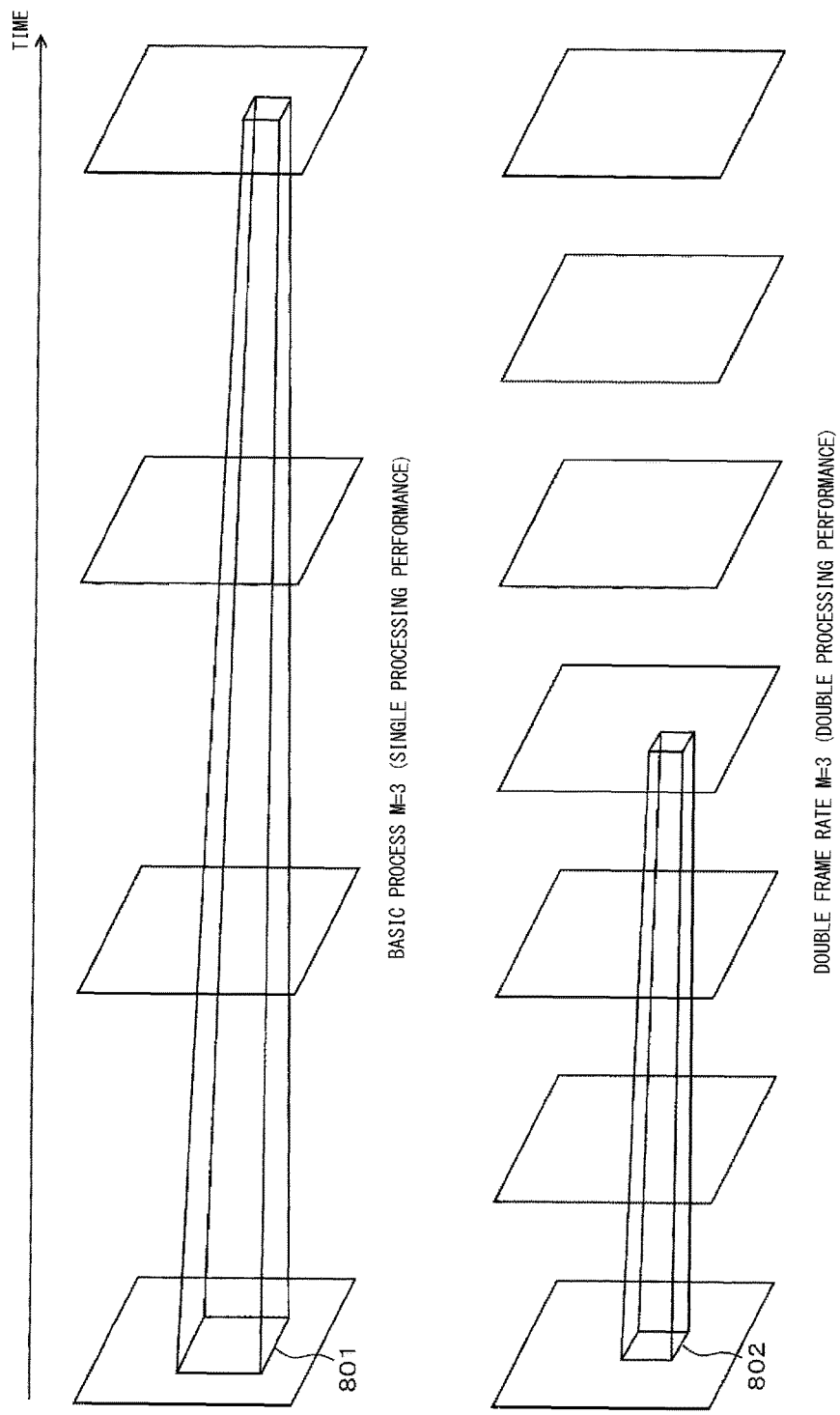
FIG. 8 A diagram showing an example of a first mode and a second mode among three processing modes assumed with the moving image coding device.

FIG. 8 is a diagram showing an example of a first mode and a second mode among the three processing modes assumed with the moving image coding device. The first basic processing mode is shown in the top of FIG. 8. In this processing mode, in a case where the frame rate is 30 fps in an image of an FHD (Full High Definition) size, for example, the coding is performed using a coding type of IBBPBB sequence with M=3. In this case, for P pictures, three pictures before it is referenced, and a search range 801 in I pictures is regarded as a basic search range.

Next, the second processing mode is shown in the bottom of FIG. 8. In this processing mode, the frame rate is twice that of the basic processing described above. In this case, by doubling the frame rate, the distance between frames is halved. Assuming that the motion amount of the image in this processing mode is same as that in the basic processing mode described above, it is found that the P pictures requires the search range 802 which is only a half of the basic search range. However, this processing mode needs to process twice as many frames, twice faster processing speed (processing performance) is required when using the same processing clock.

Figure 9:
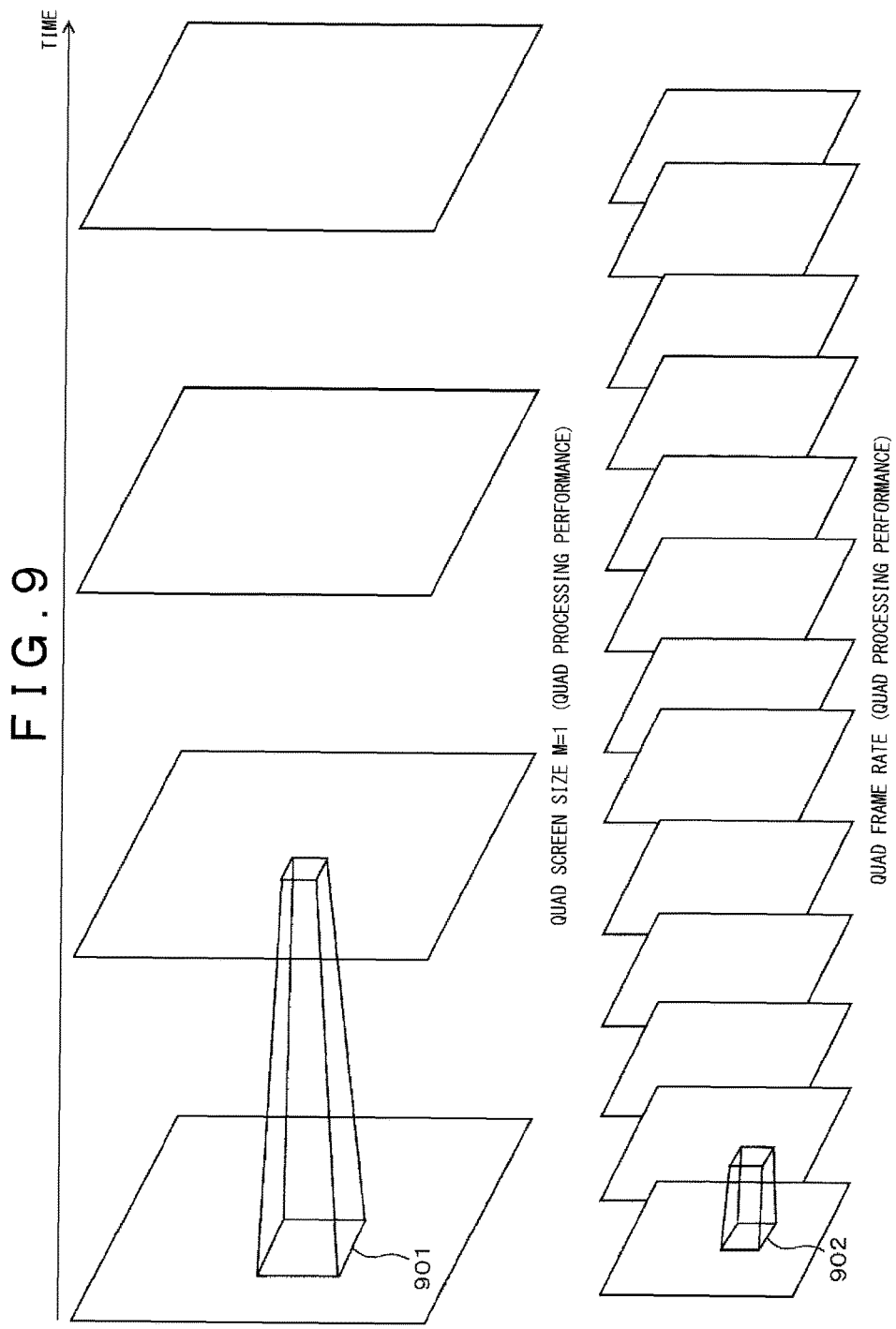
FIG. 9 A diagram showing an example of a third mode among the three processing modes assumed with the moving image coding device.

Finally, the third processing mode is described. FIG. 9 is a diagram showing an example of the third mode among the three processing modes assumed with the moving image coding device. In this example shown in the top of FIG. 9, the image size is four times larger than that in the basic processing mode. This example corresponds to an image of 4 k2 k, for example, using the coding type of IPPP with M=1. In this case, because the image size is four times larger, using the same processing clock, as described above, four times faster processing performance is required.

In this case, although the image size is four times larger, the MB size for calculating the motion vector remains the same, and therefore the search range in the P pictures, the search range in the P pictures should be similar to the basic search range as long as the coding type with M=3 is used. However, because the third mode employs M=1 and therefore the cycle of the I pictures or P pictures is ⅓ compared to the basic pattern in the first mode described above, the search range should be within ⅓ of the basic search range.

The setting example in each mode described above is described below. FIG. 10 is a diagram showing the setting example of the three processing modes assumed with the moving image coding device. In FIG. 10, the processing mode of the coding, the image size, the frame rate, the performance of the required moving image coding device and processing time with the performance, the M value indicative of the cycle of the I pictures or the P pictures, and the search range of the I pictures required are stored in association with one another.

It is found from FIG. 10 that the performance increases from one to two and four times with respect to each processing mode, and accordingly the processing time at the same operating frequency changes from one to ½ and ¼. It is also found that the required search range changes from one to ½ and ⅓.

The moving image coding device described above is an example of applying the third mode shown in FIG. 9, showing a configuration when achieving four times better performance compared to the case of the first mode. The moving image coding device shown in FIG. 1 is configured so that the coarse search unit 104 supplies the data to a plurality of MB parallel line processing units, which means that it suffices to process at least ⅓ of the search in ¼ of the processing time compared to the basic processing mode.

With this processing ability, compared to the four-time performance, the processing time is twice longer with the two-time performance (second mode) and four times longer with the one-time performance (first mode), which allows for achieving three modes presenting different processing times on the same circuit.

It should be noted that, when the frame rate is 120 fps, in addition to the first to third processing modes described above, it is also possible to set another coding mode using a coding type of IPP sequence with M=1 as the fourth processing mode. In this case, because the frame rate is four times higher, as with the cases described above, when using the same processing clock, four times higher processing performance is required and thus the processing time is reduced to ¼. Furthermore, because the frame rate is four times higher and the M value is reduced to ⅓, the search range is ¹⁄₁₂.

Figure 11:
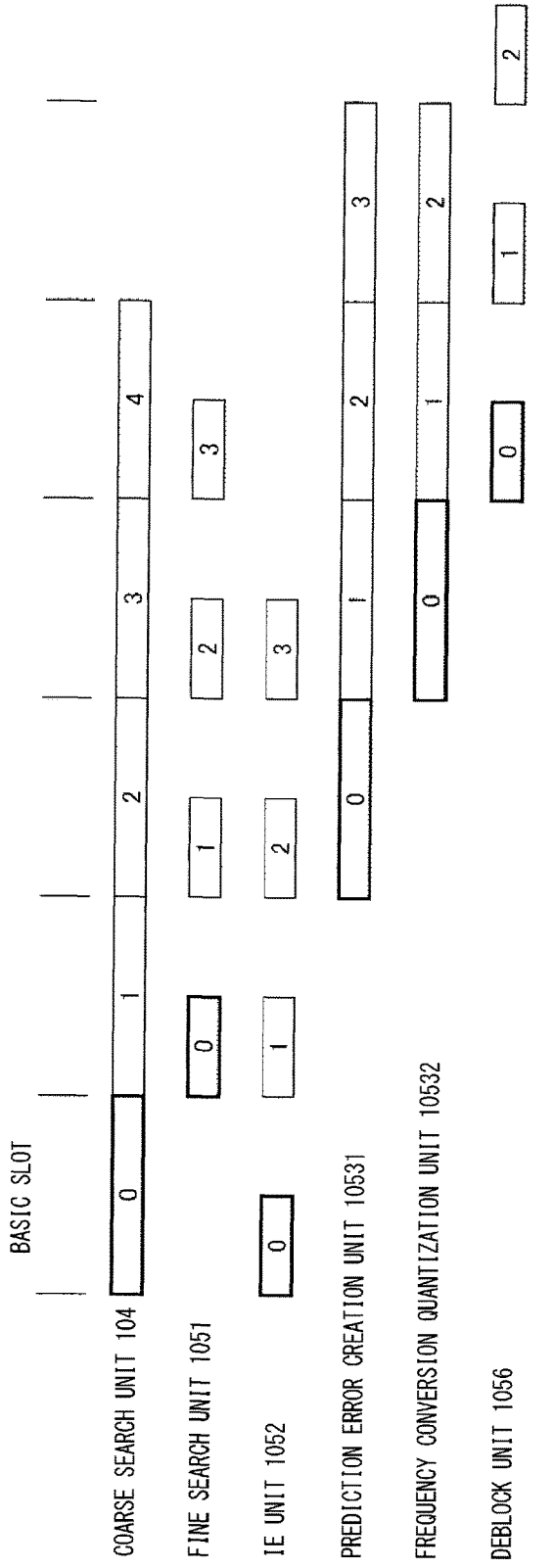
FIG. 11 A diagram showing an example of the pipeline during the first processing mode.
Figure 12:
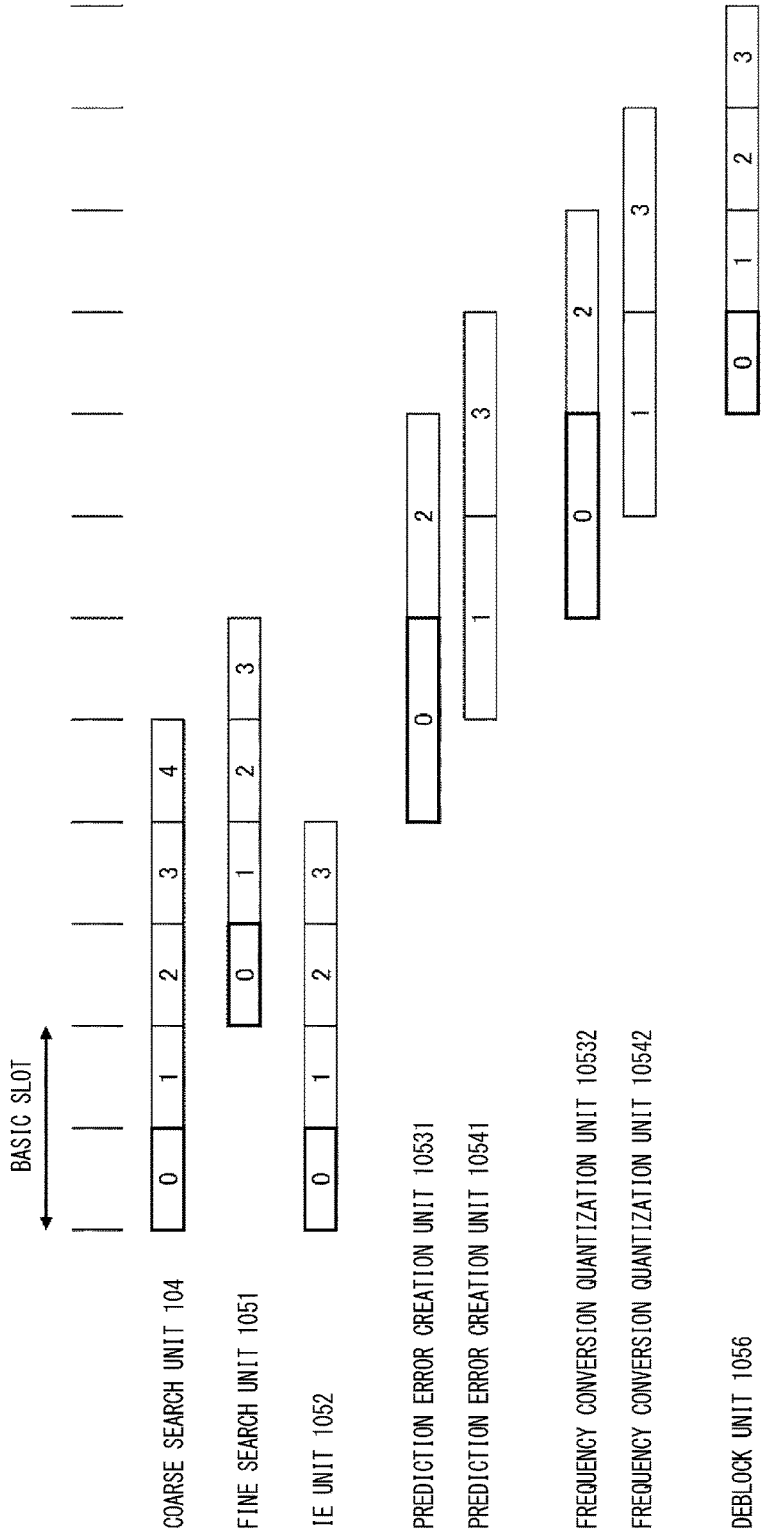
FIG. 12 A diagram showing an example of the pipeline during the second processing mode.

The pipelines during the first processing mode and the second processing mode are shown in FIGS. 11 and 12, respectively. With the pipeline of the first processing mode shown in FIG. 11, each process may be performed during the basic slot that is the duration of four slots shown in FIG. 7. In this case, there is no need of performing the parallel process, and therefore, for example, the first MB parallel line processing unit 105 shown in FIG. 1 and the first MB parallel processing unit 1053 belonging to the first MB parallel line processing unit 105 are operated in the pipeline as shown in FIG. 11 for the processing.

In the second processing mode shown in FIG. 12, the process may be performed during the duration of two slots shown in FIG. 7, which employs a dual-parallel processing. In this case, the process is performed in the pipeline shown in FIG. 12 using the first MB parallel line processing unit 105 shown in FIG. 1 and the first MB parallel processing unit 1053 and the second MB parallel processing unit 1054 belonging to the first MB line parallel processing unit 105.

In both cases, each of the search memory readout unit 103, the coarse search unit 104, and the original image readout unit 102 supplies data to the MB line parallel processing unit as a single circuit.

Moreover, this configuration can handle other processing modes that are not described herein depending on the image resolution, the frame rate, and the like, including handling a processing mode with the frame rate four times higher than that of the third mode requiring four times higher processing performance compared with the third processing mode. Furthermore, in this moving image coding device, the pipeline can also be switched to a desired processing mode by means of a user setting. Such a configuration enables the power consumption reduction even when the moving image coding device performs a plurality of parallel processes.

(Further Power Saving)

A further power saving is described below. The fine search unit in this moving image coding device has to operate only when an MB to be coded is an inter-image coding mode (Inter coding mode) but not when it is an intra-image coding mode (Intra coding mode). The fine search process in the the pipeline performed by the moving image coding device should be performed after the coarse search in the Inter coding and the IE unit in the Intra coding have been completed. That is, the MB line parallel processing unit determines whether the image to be processed should be processed in the Intra coding mode or the Inter coding mode, and only when it is determined to employ the Inter coding mode, the fine search unit calculates a precise moving amount and a precise moving direction and the moving amount and the moving direction of the MB calculated by the coarse search unit 104.

In this moving image coding device, the MB line parallel processing or control unit determines whether to use the Intra coding or the Inter coding based on the processing result from the coarse search unit and the IE unit, and when it is determined to use the Intra coding, it controls the fine search unit not to operate, thereby reducing the power consumption required for the fine search. This can be achieved by the technique of not sending a process start signal for starting the fine search or of stopping the clock. For determination of whether to use the Intra coding or the Inter coding, an error between the original image and each prediction image is compared with a value taking in consideration the coding for sending the image.

(Effect of CABAC Parallelization)

This enables the parallel processing by the unit of MB line even when using the CABAC parallelization, thereby achieving the low power consumption and the high image quality.

(Configuration for Decoding)

Figure 13:
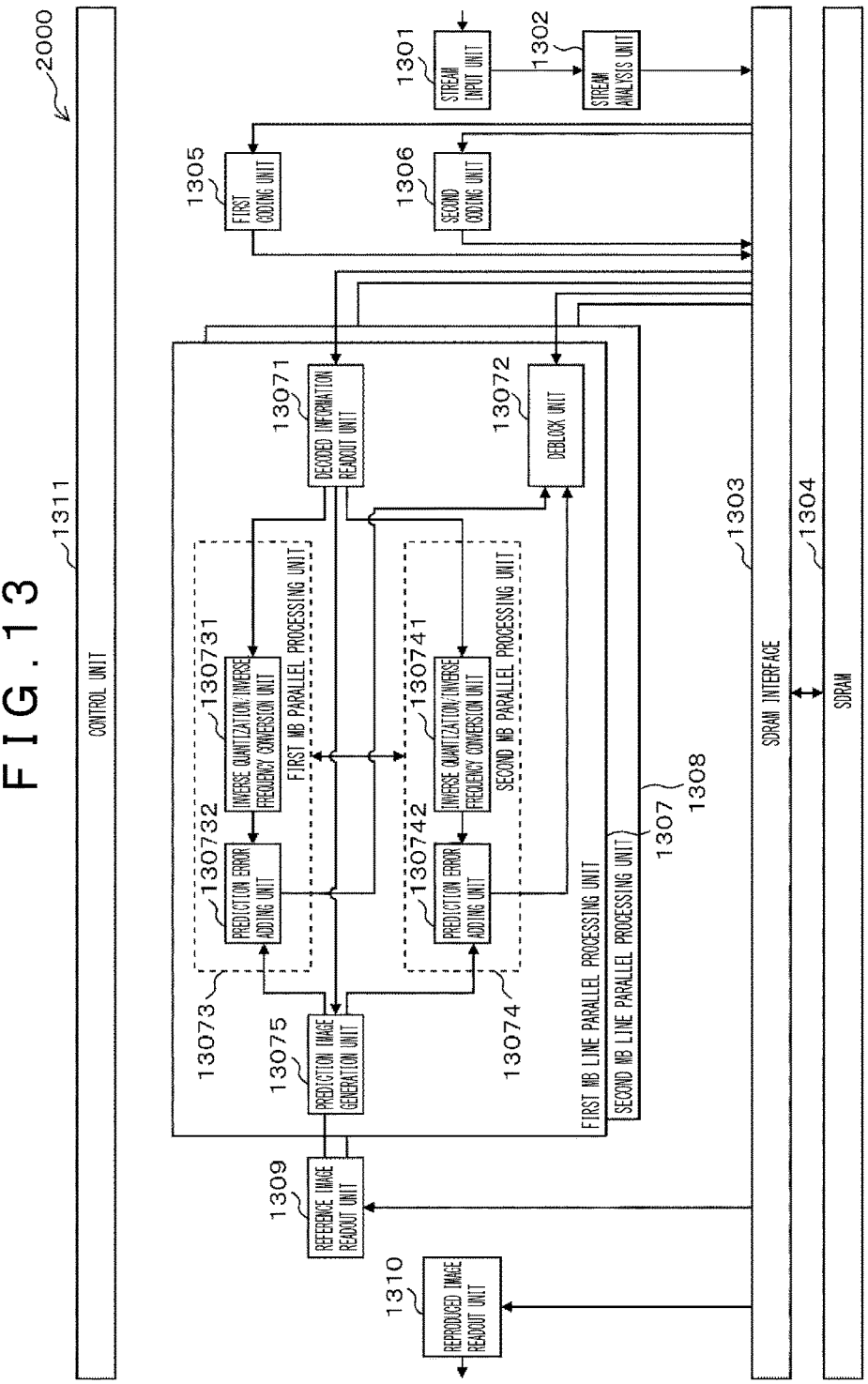
FIG. 13 A diagram showing an exemplary configuration of a moving image decoding device according to an embodiment of the present invention.

The parallelization performed by the moving image coding device is applicable to a decoding device. FIG. 13 shows an exemplary configuration of a moving image decoding device 2000 according to this embodiment. In the moving image decoding device 2000, a stream to be reproduced is obtained by a stream input unit 1301, and a leading position of each frame is analyzed by a stream analysis unit 1302. The analysis result is transferred to an SDRAM interface 1303 and stored in an SDRAM 1304. The reason why this analysis is performed is that it is necessary to know the leading position that separates frames contained in the stream by checking a start code of the frame as each decoding unit (first decoding unit 1305, second decoding unit 1306) performs the parallel processing with respect to each frame. The frames are read out of the SDRAM 1304 by the unit of frame and processed in parallel by the first decoding unit 1305 and the second decoding unit 1306, and then the decoded information of the MB (similar content to the coded information) is stored in the SDRAM 1304 with respect to each MB line.

The decoded information of the MB with respect to each MB line is read out of the SDRAM 1304 by a first MB line parallel processing unit 1307 and a first MB line parallel processing unit 1308, and processed in parallel with respect to each MB line as with the moving image coding device. In the first MB line parallel processing unit 1307, a decoded information readout unit 13071 reads out the decoded information and supplies it to a first MB parallel processing unit 13073 and a second MB parallel processing unit 13074, and also supplies information required for generating the prediction image to a prediction image generation unit 13075. A deblock unit 13072 then performs deblock filtering to the image generated by each MB parallel processing unit, and the SDRAM 1304 stores the resulting image therein.

In the MB parallel processing unit of each MB line parallel processing unit, the inverse frequency conversion unit performs inverse quantization and inverse frequency conversion on the data obtained from the decoded information readout unit, the prediction error adding unit adds the data of the prediction image generated, inverse-quantized, and inverse frequency-converted at the time of the Intra prediction to the prediction image, and the resulting data is output to the deblock unit.

A reference image readout unit 1309 reads out the reference image from the SDRAM 1304, and supplies the reference image data to the prediction image generation unit 13075 that generates the prediction image at the time of the Intra prediction. A reproduced image readout unit 1310 reads out the decoded image from the SDRAM 1304 in the display order. A control unit 1311 controls the general operation and shares the coding parameters.

The decoding device has a plurality of MB parallel processing units and MB line parallel processing units like the moving image coding device, and processes the pipelines in parallel with at most a half duration of the basic slot offset from one another for the parallel processing, as shown in FIG. 7, thereby enabling the decoding with the low power consumption. In this example, the duration of the basic slot is equal to four slots, and therefore the inverse quantization/inverse frequency conversion unit and the prediction error adding unit of the MB parallel processing unit perform the process with at most a duration of at most two slots offset from one another as shown in FIG. 7.

Figure 14:
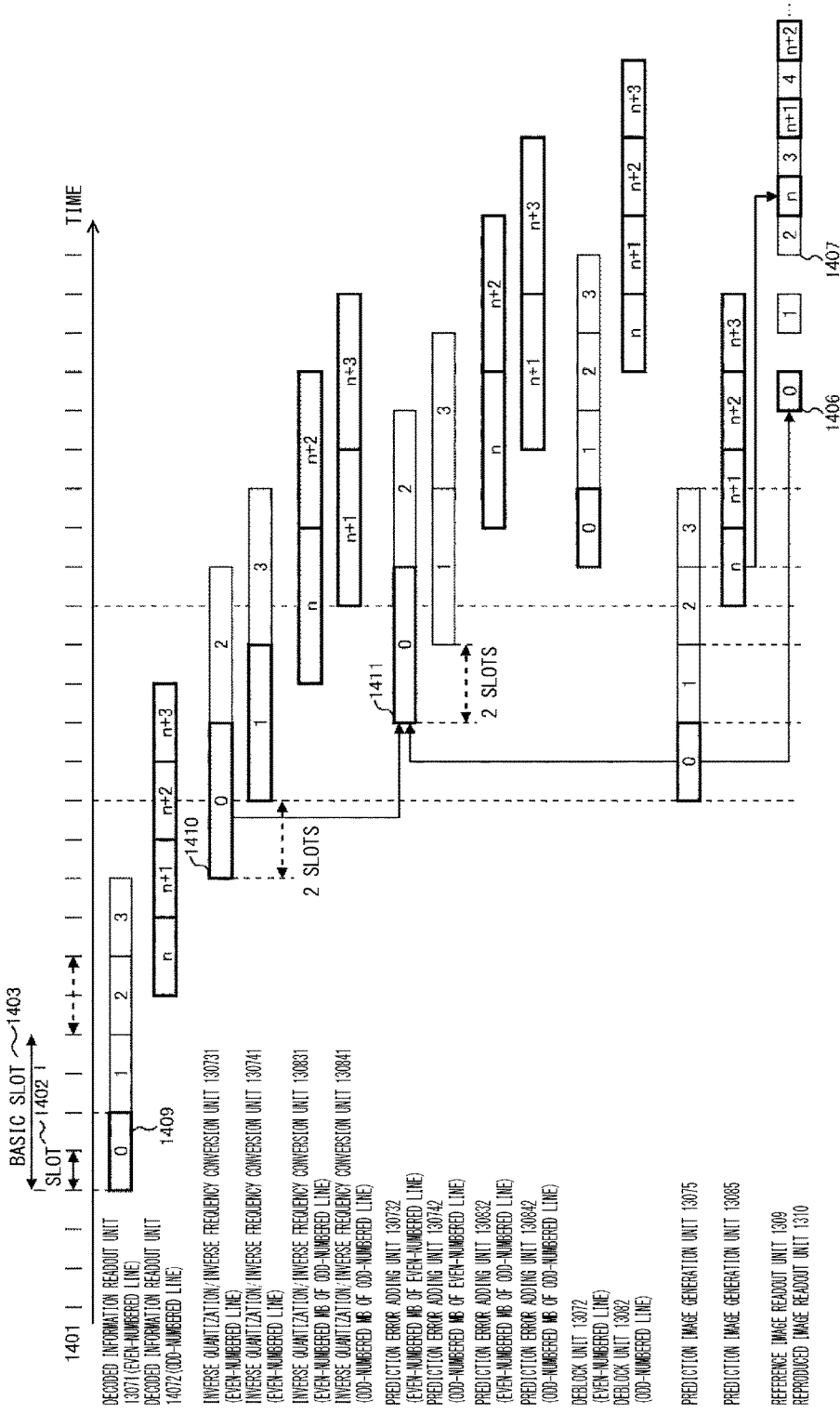
FIG. 14 A diagram showing an example of the pipeline in a case of parallel processing the two MB lines using the configuration shown in FIG. 13 (decoding).

FIG. 14 shows an example of the pipeline in a case of parallel processing the two MB lines using the configuration shown in FIG. 13, for a process in a frame. In this case, as with the case shown in FIG. 1, the first MB line parallel processing unit 1307 processes the even-numbered MB line and the second MB line processing unit 1308 processes the odd-numbered MB line, where among the MBs contained in the MB line, the even-numbered MB is processed by the first MB parallel processing unit 13073 and the odd numbered MB is processed by the second MB parallel processing unit 13074. Definitions of the count of the MB numbers in the MB line, the temporal axis, the slot, and the basic slot are same as those described with reference to FIG. 7, and therefore the description thereof is omitted.

In the decoding device, in contrast to the coding device, the decoded information readout unit 13071 reads out of the SDRAM 1304 the decoded information stored by the first decoding unit 1305 and the second decoding unit 1306. In this example, one decoded information readout unit is provided to each MB line parallel processing unit so that there is one circuit with respect to each MB line, and therefore the circuit is configured to terminate the process in the duration of two slots like the fine search unit and the IE unit in the coding device. For example, because the first MB line parallel processing unit 1307 is provided with a single decoded information readout unit 13071, it processes each MB in the MB line in the duration of two slots like the coding device. The second MB line parallel processing unit 1308 is also provided with a single decoded information readout unit, which performs the similar process.

One inverse quantization/inverse frequency conversion unit and one prediction error adding unit of the MB parallel processing unit are provided in each MB parallel processing unit. In the example shown in FIG. 14, the first MB line parallel processing unit 1307 has the first MB parallel processing unit 13073 that processes the even-numbered MB in the even-numbered MB line and the second MB parallel processing unit 13074 that processes the odd-numbered MB in the same MB line. The second MB line parallel processing unit 1308 also has a first MB parallel processing unit 13083 that processes the even-numbered MB of the odd-numbered MB line and a second MB parallel processing unit 13084 that processes the odd-numbered MB in the same MB line. Like the coding device, to have them perform the parallel processing, at most a half of the duration of the basic slot is offset for the parallel processing. Because the duration of the basic slot is four slots in this example, the inverse quantization/inverse frequency conversion unit and the prediction error adding unit in the MB parallel processing unit perform the process with the duration of at most two slots 1410, 1411 offset.

Each inverse quantization/inverse frequency conversion unit performs inverse quantization and inverse frequency conversion on the coded information received from the coded information readout unit. Each prediction error adding unit outputs the inverse-quantized and inverse frequency-converted data added with the prediction image to the deblock unit. Each prediction image generation unit generates the prediction image based on the coded information received from the coded information readout unit 13071 and the reference image received from the reference image readout unit 1309, and outputs the prediction image to a prediction error calculating unit of each MB parallel processing unit.

In the case of decoding, as with the case of coding, the reference image readout unit 1309 looks ahead the reference image. The reproduced image readout unit 1310 reads out the generated decoded image from the SDRAM in the display order, and outputs it in synchronization with the display side. In this example, in a line including the 0 MB and a line including the n MB, as an example, the process of the n MB starts after the process of the three MBs including the 3 MB is terminated.

Furthermore, as shown in FIGS. 11 and 12, by operating a part of the parallel processing unit depending on the parallelism (processing mode) of the required pipeline, the power consumption reduction is also possible in a plurality of parallel processes. Moreover, with this decoding device, as with the moving image coding device, when the bitrate, the resolution, and/or the frame rate of the stream are already known, it is also possible to change the parallelism (processing mode) of the MB parallel processing unit, the MB line parallel processing unit, and the decoding unit by means of the user setting.

REFERENCE SIGNS LIST

1000 Moving image coding device
101 Original image write unit
102 Original image readout unit
103 Search memory readout unit
104 Coarse search unit
105, 106 MB line parallel processing unit
107 SDRAM
108 SDRAM interface
109, 110 Coding unit
111 Stream output unit
112 Control unit
2000 Moving image decoding device
1301 Stream input unit
1302 Stream analysis unit
1303 SDRAM interface
1304 SDRAM
1305 First decoding unit
1306 Second decoding unit
1307, 1308 Line parallel processing unit
13071 Decoded information readout unit
13072 Deblock unit
13073, 13074 MB parallel processing unit
13075 Prediction image generation unit
1309 Reference image readout unit
1310 Reproduced image readout unit
1311 Control unit

The invention claimed is:

1. A moving image coding device that divides an image into MBs and codes the MBs, the moving image coding device having a memory and a processor, the processor comprising:
    a coarse search unit that calculates a moving amount and a moving direction of each of the MBs;
    an MB parallel processing unit that performs preprocessing to code the image with respect to each of the MBs that are contained in an MB line constituting the image and for which the moving amount and the moving direction are calculated, and writes the resulting MB information in a storage unit in the processing order of the MBs;
    a coding unit that reads out the MB information stored in the storage unit in a raster order and codes the MBs; and
    an MB line parallel processing unit that configures the MB arranged in a horizontal direction as an MB line, performs the preprocessing with respect to each of the MB line, and includes a plurality of the MB parallel processing units;
    wherein the moving image coding device is operable in two modes, switchable between a mode performed by one or more of the MB parallel processing units included in the MB line parallel processing unit and a mode performed by one or more of the MB parallel processing units included in a plurality of MB line parallel processing units.

2. The moving image coding device according to claim 1, wherein the coarse search unit outputs a processing result performed in a processing time divided by the number of the MB parallel processing units connected in parallel to the MB line parallel processing unit including the MB parallel processing unit.

3. The moving image coding device according to claim 2, wherein the coarse search unit alternately codes the MB contained in the MB line preprocessed by the MB line parallel processing unit and the MB contained in the MB line preprocessed by another the MB line parallel processing unit.

4. The moving image coding device according to claim 1, wherein the coding unit includes a processing unit that reads out the MBs contained in the image in a raster order and codes the MBs, and the processing unit processes different images in parallel.

5. The moving image coding device according to claim 1,
wherein the coarse search unit performs a process by switching, depending on the number of the MB line parallel processing units or the MB parallel processing units connected in parallel, among a first processing mode in which the total number of pixels in the image is n, an M value indicative of a cycle count of an I picture or a P picture is 3, and a frame rate is p, a second processing mode in which the total number of pixels is n, the M value is 3, and the frame rate is 2p, and a third processing mode in which the total number of pixels is 4n, the M value is 1, and the frame rate is p,
the one MB line parallel processing unit and the one MB parallel processing unit perform the preprocessing in the first processing mode,
the one MB line parallel processing unit and the plurality of MB parallel processing units perform the preprocessing in the second processing mode, and
the plurality of MB line parallel processing units and the plurality of MB parallel processing unit perform the preprocessing in the third processing mode.

6. The moving image coding device according to claim 1,
wherein the coarse search unit performs a process by switching, depending on the number of the MB line parallel processing units or the MB parallel processing units connected in parallel, among a first processing mode in which the total number of pixels in the image is n, an M value indicative of a cycle count of an I picture or a P picture is 3, and a frame rate is p, a second processing mode in which the total number of pixels is n, the M value is 3, and the frame rate is 2p, and a third processing mode in which the total number of pixels is n, the M value is 1, and the frame rate is 4p,
the one MB line parallel processing unit and the one MB parallel processing unit perform the preprocessing in the first processing mode,
the one MB line parallel processing unit and the plurality of MB parallel processing units perform the preprocessing in the second processing mode, and
the plurality of MB line parallel processing units and the plurality of MB parallel processing unit perform the preprocessing in the third processing mode.

7. The moving image coding device according to claim 1, wherein each of the MB line parallel processing units validates a CBP (Coded Block Pattern) or a quantization coefficient of the MB contained in the MB line, codes MBs from the validated MB to an end of the MB line using a predetermined quantization coefficient, and, when the CBP is invalid, codes the MB at a top of the MB line following the MB line coded by the quantization coefficient using the predetermined quantization coefficient.

8. The moving image coding device according to claim 1, wherein each of the MB line parallel processing units validates a CBP or a quantization coefficient of the MB at an end of the MB line, codes the MB at the end using a predetermined quantization coefficient, and, when the CBP is invalid, codes the MB at a top of the MB line following the MB line coded by the quantization coefficient using the predetermined quantization coefficient.

9. The moving image coding device according to claim claim 1,
wherein the MB parallel processing unit includes a prediction error creation unit that generates an intra-frame prediction error based on the MB or an inter-frame prediction error based on the MB, a frequency conversion quantization unit that quantizes the generated prediction error after having received frequency conversion, and a coded information creation unit that generates coded information for coding the quantized MB,
the MB parallel line processing unit includes an IE unit that determines whether to use an Intra coding mode or an Inter coding mode, a coded information write unit that writes the coded information generated with respect to the each MB in the storage unit in a coding order, a fine search unit that, when it is determined to use the Intra coding mode, calculates a more detailed moving amount and a more detailed moving direction and the moving amount and the moving direction of the MB calculated by the coarse search unit, and a deblock unit that applies a deblock filter to a decoded image, and
the MB line parallel processing unit or the MB parallel processing unit performs parallel processing with a duration offset, the duration corresponding to a number of slots being processed in parallel, the slot being processing time of the MB in the MB line.

10. The moving image coding device according to claim 9, wherein the IE unit determines whether an image to be processed should be processed in the Intra coding mode or the Inter coding mode, and when it is determined to use the Intra coding mode, does not run the fine search unit for calculating the moving amount and the moving direction more detailed than the moving amount and the moving direction of the MB calculated by the coarse search unit.

11. A moving image decoding device that decodes a coded image with respect to each MB, the moving image decoding device having a memory and a processor, the processor comprising:
a decoding unit that decodes the MBs contained in an MB line constituting the image in a raster order and stores MB information as a result of the decoding process in a storage unit;
a plurality of decoded information readout units that perform a coded information readout process that is a post process for decoding the image in the processing order of the MBs;
a plurality of MB parallel processing units each including an inverse quantization/inverse frequency conversion unit that performs inverse quantization and then inverse frequency conversion on the image with respect to each MB contained in the MB line and a prediction error adding unit that generates a decoded image by adding a prediction image and a residual error; and
a plurality of MB line parallel processing units each including the MB parallel processing unit, a deblock unit that applies a deblock filter to the decoded image, and a prediction image generation unit that generates the prediction image,
wherein the MB line parallel processing unit or the MB parallel processing unit performs parallel processing with a duration offset, the duration corresponding to a number of slots processed in parallel, the slot being processing time of the MB in the MB line; and
wherein the moving image decoding device is operable in two modes, switchable between a mode performed by one or more of the MB parallel processing units included in the MB line parallel processing unit and a mode performed by one or more of the MB parallel processing units included in a plurality of MB line parallel processing units.

12. The moving image decoding device according to claim 11, further comprising a stream analysis unit that analyzes a separation position of the image contained in a stream,
  wherein the decoding unit includes a plurality of processing units that decode the MBs by the unit of image, and the processing units process different frames separated by the analyzed separation position in parallel.

13. A moving image coding/decoding method for dividing an image into MBs and codes the MBs, comprising:
  a moving image coding step including:
    a coarse search step of calculating a moving amount and a moving direction of each of the MBs;
    a plurality of MB parallel processing step of performing preprocessing to code the image with respect to each of the MBs that are contained in an MB line constituting the image and for which the moving amount and the moving direction are calculated, and writes the resulting MB information in a storage unit in the processing order of the MBs; and
    a coding step of reading out the MB information stored in the storage unit in a raster order and codes the MBs;
  wherein the moving image coding step is operable in two modes, switchable between a mode performed by one or more of the MB parallel processing units included in the MB line parallel processing unit and a mode performed by one or more of the MB parallel processing units included in a plurality of MB line parallel processing units; and
  a moving image decoding step including:
    a decoding step of decoding the MB contained in the MB line constituting the coded image and storing the MB information as a result of coding in the storage unit; and
    a plurality of coded information readout steps of performing a coded information readout process on each of the MBs as preprocessing to decode the image.

14. The moving image coding/decoding method according to claim 13, wherein the moving image coding step further includes:
  generating an intra-frame prediction error based on the MB or an inter-frame prediction error based on the MB, quantizing the generated prediction error after having received frequency conversion, and generating coded information for coding the quantized MB,
  determining whether to use an Intra coding mode or an Inter coding mode, writing the coded information generated with respect to the each MB in the storage unit in a coding order, performing a fine search step that includes, when it is determined to use the Intra coding mode, calculating a more detailed moving amount and a more detailed moving direction and the moving amount and the moving direction of the MB calculated by the coarse search step, and applying a deblock filter to a decoded image, and
  performing, by the MB line parallel processing unit or the MB parallel processing unit, parallel processing with a duration offset, the duration corresponding to a number of slots being processed in parallel, the slot being processing time of the MB in the MB line.

15. The moving image coding/decoding method according to claim 14, wherein the moving image coding step further includes:
  determining whether an image to be processed should be processed in the Intra coding mode or the Inter coding mode, and when it is determined to use the Intra coding mode, not performing the fine search step for calculating the moving amount and the moving direction more detailed than the moving amount and the moving direction of the MB calculated by the coarse search unit.

16. The moving image coding/decoding method according to claim 13, wherein the moving image decoding step further includes:
  performing inverse quantization and then inverse frequency conversion on the image with respect to each MB contained in the MB line and generating a decoded image by adding a prediction image and a residual error; and
  applying a deblock filter to the decoded image and generating the prediction image,
  wherein the MB line parallel processing unit or the MB parallel processing unit performs parallel processing with a duration offset, the duration corresponding to a number of slots processed in parallel, the slot being processing time of the MB in the MB line; and
  wherein the moving image decoding step is operable in two modes, switchable between a mode performed by one or more of the MB parallel processing units included in the MB line parallel processing unit and a mode performed by one or more of the MB parallel processing units included in a plurality of MB line parallel processing units.

17. The moving image coding/decoding method according to claim 13, wherein the coarse search step further includes:
  outputting a processing result performed in a processing time divided by the number of the MB parallel processing units connected in parallel to the MB line parallel processing unit including the MB parallel processing unit.

18. The moving image coding/decoding method according to claim 13, wherein the coarse search step further includes:
  alternately coding the MB contained in the MB line preprocessed by the MB line parallel processing unit and the MB contained in the MB line preprocessed by another the MB line parallel processing unit.

19. The moving image coding/decoding method according to claim 13, wherein the coarse search step further includes:
  performing a process by switching, depending on the number of the MB line parallel processing units or the MB parallel processing units connected in parallel, among a first processing mode in which the total number of pixels in the image is n, an M value indicative of a cycle count of an I picture or a P picture is 3, and a frame rate is p, a second processing mode in which the total number of pixels is n, the M value is 3, and the frame rate is 2p, and a third processing mode in which the total number of pixels is 4n, the M value is 1, and the frame rate is p,
  the one MB line parallel processing unit and the one MB parallel processing unit performing the preprocessing in the first processing mode,
  the one MB line parallel processing unit and the plurality of MB parallel processing units performing the preprocessing in the second processing mode, and
  the plurality of MB line parallel processing units and the plurality of MB parallel processing unit performing the preprocessing in the third processing mode.

20. The moving image coding/decoding method according to claim 13, wherein the coarse search step further includes:
- performing a process by switching, depending on the number of the MB line parallel processing units or the MB parallel processing units connected in parallel, among a first processing mode in which the total number of pixels in the image is n, an M value indicative of a cycle count of an I picture or a P picture is 3, and a frame rate is p, a second processing mode in which the total number of pixels is n, the M value is 3, and the frame rate is 2p, and a third processing mode in which the total number of pixels is n, the M value is 1, and the frame rate is 4p,
- the one MB line parallel processing unit and the one MB parallel processing unit performing the preprocessing in the first processing mode,
- the one MB line parallel processing unit and the plurality of MB parallel processing units performing the preprocessing in the second processing mode, and
- the plurality of MB line parallel processing units and the plurality of MB parallel processing unit performing the preprocessing in the third processing mode.

* * * * *